US011577598B2

(12) United States Patent
Kawamura et al.

(10) Patent No.: US 11,577,598 B2
(45) Date of Patent: Feb. 14, 2023

(54) BEARING DEVICE FOR VEHICLE WHEEL, AND VEHICLE PROVIDED WITH BEARING DEVICE FOR VEHICLE WHEEL

(71) Applicant: NTN CORPORATION, Osaka (JP)

(72) Inventors: Mitsuo Kawamura, Iwata (JP); Kentaro Nishikawa, Iwata (JP); Taisuke Igi, Iwata (JP); Yuuji Yada, Iwata (JP); Yasuyuki Fujita, Iwata (JP); Hiroki Yabuta, Iwata (JP)

(73) Assignee: NTN CORPORATION, Osaka (JP)

( * ) Notice: Subject to any disclaimer, the term of this patent is extended or adjusted under 35 U.S.C. 154(b) by 373 days.

(21) Appl. No.: 16/810,314

(22) Filed: Mar. 5, 2020

(65) Prior Publication Data

US 2020/0198456 A1   Jun. 25, 2020

Related U.S. Application Data

(63) Continuation of application No. PCT/JP2018/033160, filed on Sep. 7, 2018.

(30) Foreign Application Priority Data

Sep. 8, 2017   (JP) .............................. JP2017-173300
Oct. 17, 2017  (JP) .............................. JP2017-200805
Oct. 17, 2017  (JP) .............................. JP2017-200806

(51) Int. Cl.
*H02K 7/06*   (2006.01)
*B60K 7/00*   (2006.01)
(Continued)

(52) U.S. Cl.
CPC ............ *B60K 7/0007* (2013.01); *B60B 35/18* (2013.01); *F16C 19/18* (2013.01); *F16C 41/00* (2013.01);
(Continued)

(58) Field of Classification Search
CPC .. B25D 16/00; B25D 17/08; B25D 2250/051; B25F 5/02; B60B 2900/351;
(Continued)

(56) References Cited

U.S. PATENT DOCUMENTS 6,894,484 B2   5/2005   Takizawa et al.
7,116,095 B2   10/2006  Takizawa et al.
(Continued)

FOREIGN PATENT DOCUMENTS

CN   1862043 A   11/2006
CN   1922047 A   2/2007
(Continued)

OTHER PUBLICATIONS

Translation of CN-205490273-U (Year: 2016).*
(Continued)

*Primary Examiner* — Naishadh N Desai

(57) ABSTRACT

A wheel support bearing assembly includes a wheel support bearing and a power unit. The power unit is that of an outer rotor design in which a stator is located at an outer periphery of the wheel support bearing and a rotor is located radially outward of the stator. A radial extension of the entire power unit is sized to be radially inward of a peripheral section of a brake rotor. An entirety of the power unit, excluding a mount part thereof to a hub flange, is sized to be situated in an axial range between the hub flange and a mount surface, on an inboard side of the wheel support bearing. The rotor includes an outer shell magnetic body, which is made from soft magnetic material and forms an outer shell of the power unit, and permanent magnets that are provided to the outer shell magnetic body.

10 Claims, 24 Drawing Sheets

(51) Int. Cl.
  *H02K 11/21* (2016.01)
  *B60B 35/18* (2006.01)
  *F16C 19/18* (2006.01)
  *F16C 41/00* (2006.01)
  *H02K 7/00* (2006.01)
  *H02K 7/08* (2006.01)
  *H02K 7/102* (2006.01)
  *H02K 21/22* (2006.01)

(52) U.S. Cl.
  CPC ............ *H02K 7/006* (2013.01); *H02K 7/085* (2013.01); *H02K 7/102* (2013.01); *H02K 11/21* (2016.01); *H02K 21/22* (2013.01); *F16C 2326/02* (2013.01)

(58) Field of Classification Search
  CPC ............ B60B 2900/551; B60B 35/001; B60B 35/122; B60B 35/18; B60K 1/00; B60K 17/354; B60K 2007/0092; B60K 7/00; B60K 7/0007; B60L 2220/44; F16C 19/18; F16C 19/186; F16C 2326/02; F16C 2326/06; F16C 41/00; F16C 41/004; H02K 11/21; H02K 21/22; H02K 7/006; H02K 7/08; H02K 7/085; H02K 7/102; Y02T 10/64
  See application file for complete search history.

(56) References Cited

U.S. PATENT DOCUMENTS

| | | | |
|---|---|---|---|
| 7,556,580 B2 | 7/2009 | Saito et al. | |
| 7,614,796 B2 | 11/2009 | Hattori et al. | |
| 7,717,203 B2 | 5/2010 | Yoshino et al. | |
| 7,901,143 B2 | 3/2011 | Hattori et al. | |
| 10,369,880 B2 | 8/2019 | Kurita et al. | |
| 10,536,051 B2 | 1/2020 | Michel | |
| 2002/0097040 A1* | 7/2002 | Takizawa | F16C 19/525 324/207.25 |
| 2005/0140357 A1 | 6/2005 | Takizawa et al. | |
| 2006/0269181 A1 | 11/2006 | Hattori et al. | |
| 2007/0181357 A1 | 8/2007 | Saito et al. | |
| 2008/0070736 A1* | 3/2008 | Yoshino | B60K 7/0007 301/6.5 |
| 2010/0014795 A1 | 1/2010 | Hattori et al. | |
| 2010/0207474 A1* | 8/2010 | Osada | B60L 15/2009 310/114 |
| 2017/0110933 A1* | 4/2017 | Michel | B60L 3/0061 |
| 2018/0326833 A1 | 11/2018 | Kurita et al. | |
| 2019/0217696 A1 | 7/2019 | Kawamura et al. | |
| 2019/0248225 A1 | 8/2019 | Kawamura et al. | |

FOREIGN PATENT DOCUMENTS

| | | | |
|---|---|---|---|
| CN | 205490273 U | * 8/2016 | |
| CN | 106797147 A | 5/2017 | |
| DE | 10 2005 055 597 A1 | 5/2007 | |
| JP | 2000-166146 | 6/2000 | |
| JP | 2005-231564 | 9/2005 | |
| JP | 2006-67753 | 3/2006 | |
| JP | 2006-316904 | 11/2006 | |
| JP | 2007-182194 | 7/2007 | |
| JP | 2008144861 A | * 6/2008 | ............ F16C 33/723 |
| JP | 2008-307917 A | 12/2008 | |
| JP | 2010-163037 | 7/2010 | |
| JP | 2010-252417 | 11/2010 | |
| JP | 4694147 | 6/2011 | |
| JP | 4724075 | 7/2011 | |
| JP | 2013-147177 | 8/2013 | |
| JP | 2014-187730 | 10/2014 | |
| JP | 2017-94844 | 6/2017 | |
| JP | 2017-519680 A | 7/2017 | |
| JP | 2018-52482 | 4/2018 | |
| JP | 2018-57255 | 4/2018 | |
| JP | 2002-340922 | 11/2022 | |

OTHER PUBLICATIONS

International Preliminary Report on Patentability dated Mar. 10, 2020, in corresponding International Patent Application No. PCT/JP2018/033160.

Notice of Reasons for Refusal dated Nov. 9, 2021 in corresponding Japanese patent application No. 2017-200806.

Kenji Yamanaka et al., "Fuel Efficient Effect Verification of Mild Hybrid on Medium Sized Vehicle", Journal of the Japan Institute of Power Electronics, Mar. 31, 2017, vol. 42, pp. 89-97.

International Search Report dated Nov. 27, 2018 in corresponding International Patent Application No. PCT/JP2018/033160.

Japanese Office Action dated Mar. 8, 2022 in Japanese Patent Application No. 2017-200806 ( 4 pages; 7 pages English translation).

Extended European Search Report dated Apr. 16, 2021, in corresponding European Patent Application No. 18853042.2.

Chinese Office Action dated Aug. 2, 2022 in Chinese Patent Application No. 201880057954.2 (9 pages; 8 pages English translation).

Japanese Notice of Allowance dated Sep. 13, 2022 in Japanese Patent Application No. 2017-200806 (4 pages; 2 pages English translation).

* cited by examiner

PRIOR ART

PRIOR ART

BEARING DEVICE FOR VEHICLE WHEEL, AND VEHICLE PROVIDED WITH BEARING DEVICE FOR VEHICLE WHEEL

CROSS REFERENCE TO THE RELATED APPLICATION

This application is a continuation application, under 35 U.S.C. § 111(a) of international patent application No. PCT/JP2018/033160, filed Sep. 7, 2018, which claims priority to Japanese patent applications No. 2017-173300, filed Sep. 8, 2017, and No. 2017-200805 and No. 2017-200806, both filed Oct. 17, 2017, the entire disclosures of which are herein incorporated by reference as a part of this application.

BACKGROUND OF THE INVENTION

Field of the Invention

The invention relates to a vehicle power assembly and a vehicle comprising such a vehicle power assembly. The invention concerns a technology, etc. that allows a power unit, which yields a greater output with fewer components, to be deployed without significantly changing the mounting structure of a wheel support bearing to a vehicle body.

Description of Related Art

An in-wheel motor design integrates a motor into a wheel (the Patent Documents 1 and 2). Although it is necessary to install an inverter and a battery in a vehicle body to drive the motor, the need to install a power unit in the vehicle body can be obviated. Hence, motive power can be imparted to a vehicle without consuming a space in the vehicle body, and also the freedom in the design of the vehicle body can be enhanced. To yield a greater output, however, the motor must be increased in size or a speed reducer mechanism, etc. must be provided, as motor output is proportional to motor volume. An in-wheel motor with large motor volume or with a speed reducer mechanism is difficult to be accommodated into a wheel. Thus, an installation method, similar to those that are traditionally used for a wheel support bearing, cannot be employed in such an in-wheel motor, and therefore, changes in the structure of a vehicle body's undercarriage are inevitable.

As shown in FIGS. 24 to 26, a conventional wheel support bearing includes an outer ring 60 having a mounting flange 60a integrated therewith. The mounting flange 60a is attached to a knuckle 61. The mounting flange 60a is brought into contact with the knuckle 61 from outward (an outboard side) of a vehicle body and is fastened to the knuckle 61 with bolts 62 that are inserted from inward (an inboard side) of the vehicle body. Improved assemblability of a wheel support bearing is desirable because its installation is carried out by a vehicle manufacturer.

Motor types of synchronous motors include a Surface Permanent Magnet (SPM) type and an Interior Permanent Magnet (IPM) type. While magnet torque is the only factor in a conventional SPM motor for generating rotational torque, an IPM motor can make use of both magnet torque and reluctance torque. In this case, the volume of magnets used to yield the same torque can be reduced (the Patent Document 3).

RELATED DOCUMENT

Patent Document

[Patent Document 1] JP Patent No. 4694147
[Patent Document 2] JP Patent No. 4724075
[Patent Document 3] JP Laid-Open Patent Publication No. 2010-252417

SUMMARY OF THE INVENTION

The motor volume or size of an in-wheel motor, which is accommodated inside a wheel support bearing and a brake rotor, would be too small to meet the motive power of a vehicle body. For this reason, the provision of a speed reducer mechanism or increase in the size of a motor may be necessary to raise the output torque. However, a larger motor is more difficult to be accommodated into a wheel. Especially, if a motor becomes longer in an axial direction, a procedure to fasten together the faces of a knuckle and a flange with bolts—like the one used in a traditional fixing method for a wheel support bearing—cannot be employed. Changes in the structure of a vehicle body's undercarriage are inevitable.

By the way, it has been known that an in-wheel motor is deployed as a power assist system in a hybrid system where another power mechanism such as an internal combustion engine serves as a primary power means. In this case, the in-wheel motor is not the only component used to meet the motive power of a vehicle body. By driving the in-wheel motor or operating the in-wheel motor in regenerative braking and charging mode according to a vehicle's travel state or the state of the primary power means, fuel economy can be achieved and motive power performance of the vehicle can be improved. However, the Mode of such a power assist system presents the following challenges in terms of required functionality and cost effectiveness:

(i) the need to modify the structures of surrounding components;
(ii) mountability comparable to that of a conventional wheel support bearing;
(iii) a reduction in the number of components; and
(iv) output maximization of the output torque in a limited space.

Motor torque is generated between a stator and a rotor. To generate a greater torque, a rotor diameter can be increased. However, the radial width of a rotor has to be reduced in order to increase the diameter of the rotor in a limited space. Since an IPM motor includes magnets Mg that are embedded in a rotor Rt, the radial width of the rotor Rt needs to be made wider (FIG. 27). Also, the saliency of the rotor Rt should be made high enough to achieve large reluctance torque. Hence, the magnets Mg may need to be disposed in a V-shaped arrangement when viewed in an axial direction, or the magnets Mg may need to be embedded further inside a soft magnetic body (on a radially outer side of the outer rotor). This further adds to the need for increasing the radial width of the rotor Rt, thereby resulting in increase of the radial size of the motor (the Patent Document 3).

SUMMARY OF THE INVENTION

An object of the invention is to provide a wheel support bearing assembly and a vehicle comprising such a wheel support bearing assembly, that can deploy a power unit, which yields a greater output with fewer components, without significantly changing the mounting structure of a wheel support bearing to a vehicle body.

A wheel support bearing assembly according to the invention includes a wheel support bearing and a power unit. The wheel support bearing includes a stationary ring, a rotational ring to which a wheel of a vehicle is attached and which is rotatably supported via rolling elements by the stationary ring, and a brake rotor attached to the rotational ring. The power unit includes a stator mounted to the stationary ring, and a rotor mounted to the rotational ring. The power unit is that of an outer rotor design in which the stator is located at an outer periphery of the wheel support bearing and the rotor is located radially outward of the stator. An entirety of the power unit is sized to extend radially inward of a peripheral section of the brake rotor, against which a brake caliper is pressed. An entirety of the power unit, excluding a mount part thereof to a hub flange, provided on an outboard side, of the rotational ring, is sized to be situated in an axial range between the hub flange and a mount surface, on an inboard side of the wheel support bearing, with respect to a vehicle body. The rotor includes an outer shell magnetic body, which is made from soft magnetic material and forms an outer shell of the power unit, and permanent magnets that are provided to the outer shell magnetic body.

According to this configuration, the power unit is designed in a direct drive format in which the rotor of the power unit is mounted to the rotational ring of the wheel support bearing. This results in fewer components and a simplified structure of the power unit with resultant space saving. It also minimizes increase of the weight of the vehicle. An entirety of the power unit is sized to extend radially inward of a peripheral section of the brake rotor, against which a brake caliper is pressed, and further, an entirety of the power unit, excluding a mount part thereof to a hub flange, is sized to be situated in an axial range between the hub flange and a mount surface, on an inboard side of the wheel support bearing, with respect to a vehicle body. This ensures that a space is available inside the brake rotor for installing the power unit and enables the power unit to be accommodated therein in a compact manner.

Since the power unit is that of an outer rotor design in which the rotor is located radially outward of the stator, more surface areas can be made available, than is the case with an inner rotor design, for making the rotor and the stator face each other. In this way, the maximum output torque can be achieved in a limited space. A conventional motor generator of an outer rotor design is required to have dirt resistance as well as a strength that can withstand gravel, etc., as it is exposed to an external environment. Hence, a casing is separately arranged for a radially outer part for protection. In this case, the diameter of the motor generator must be reduced to accommodate the volume of the casing. The rotor according to the above configuration includes an outer shell magnetic body, which is made from soft magnetic material and forms an outer shell of the power unit, and permanent magnets that are provided to the outer shell magnetic body. In other words, the outer shell magnetic body not only functions as a casing but also acts to rotate itself as an outer rotor. Thus, it ensures the strength of an outer rotor and also achieves cost reduction. Further, it can realize fewer parts count as well as larger diameters of a rotor and a stator, than that of a conventional structure of an outer rotor design, etc. In this way, a power unit that can yield a greater output can be deployed in an inexpensive manner.

In the present invention, the outer shell magnetic body may have a cylindrical shape that is coaxial to the rotational ring, and the power unit may be a surface permanent magnet motor with the permanent magnets arranged on an inner peripheral surface of the outer shell magnetic body. Generally, a motor generator which involves acceleration and deceleration is subject to iron loss due to changes in magnetic flux. According to the present configuration in which a surface permanent magnet motor is employed, loss can be minimized and iron loss hardly occurs.

In the present invention, an inner peripheral surface, on an outboard side, of the rotor may be secured to an outer peripheral surface of the hub flange. In this case, the rotor can be embodied without changing the axial position of the brake rotor. A larger portion of the space at an outer periphery of the outer ring can be exploited for installation of the power unit, as the axial size of the rotor also does not need to be extended to allow the rotor to be fixed.

In the present invention, one of the outer peripheral surface of the hub flange and the inner peripheral surface, on an outboard side, of the rotor may have a radially recessed recess, and the other may have a projection that is fitted into the recess. In this case, the positioning precision of the rotor in an axial direction and a radial direction can be improved.

In the present invention, the wheel support bearing may be a bearing configured to support a driven wheel that is mechanically non-coupled to a primary drive source for the vehicle or a drive wheel coupled to the primary drive source for the vehicle. According to this feature, since a simplified structure of the power unit can be achieved with resultant space saving, the power unit can be easily installed to a driven wheel without modifying the undercarriage structure of a vehicle body, etc.

In the present invention, the stationary ring of the wheel support bearing may be an outer ring, and the rotational ring of the wheel support bearing may be an inner ring. In this case, a rotation sensor configured to detect a rotational speed or a rotational angle of the inner ring relative to the outer ring may be arranged between the inner ring and an end of the outer ring which is proximal to the hub flange. According to this feature, a rotational speed detected by the rotation sensor can be used for control of the power unit. A rotational angle can be used to calculate a rotational speed in a simple manner, and the calculated rotational speed can be used for control of the power unit or used by an anti-lock brake system. Note that one or both of a rotational speed and a rotational angle may be required according to the setup of the system. For example, both a rotational angle and a rotational speed are required to implement torque control (current control) of the power unit. Torque and a rotational speed are required to calculate consumed power and regenerated power. A rotational speed is required by the anti-lock brake system.

In the present invention, a drive voltage of the power unit for rotary driving or a regenerative voltage of the power unit may be 100 V or less. This can lower the possibility of giving an electrical shock to a passenger or a maintenance worker, etc. By equipping the wheel support bearing assembly and a medium voltage battery (≤100 V) as a battery for the power unit to an existing vehicle having only an internal combustion engine, the vehicle can be turned into a mild hybrid vehicle without needing significant modifications to the vehicle.

A vehicle according to the invention includes a wheel support bearing assembly as described. According to this configuration, the wheel support bearing assembly can be installed to a vehicle without modifying the undercarriage structure of a vehicle body. The wheel support bearing assembly can bring down fuel consumption.

In the wheel support bearing assembly as described according to the invention, the power unit may be a motor generator serving as both an electric motor and a power generator.

According to this configuration, the power generator is designed in a direct drive format in which the rotor of the power generator is mounted to the rotational ring of the wheel support bearing. This results in fewer components and a simplified structure of the vehicle power assembly as a whole with resultant space saving. It also minimizes increase of the weight of the vehicle.

The power generator is that of a surface permanent magnet type in which the rotor includes a cylindrical magnetic body made from soft magnetic material and permanent magnets on a peripheral surface of the magnetic body. With such a surface permanent magnet type, a greater output can be yielded with a radial width of the rotor that is shorter than that of an interior permanent magnet type. In general, it tends to be hard to produce rotor saliency (variation of magnetic resistance over a complete circumference of a rotor) in a motor type of an outer rotor design. This leads to insufficient reluctance torque in the case of an interior permanent magnet type, where reluctance torque is one of the factors for generating rotational torque.

Since it is harder to produce rotor saliency in a synchronous motor of an outer rotor design as mentioned, a surface permanent magnet type is more advantageous because magnet torque is the only factor in the surface permanent magnet type for generating rotational torque. It can yield the same output with a smaller, power generator diameter by increasing the magnet volume while reducing a radial thickness of a rotor. Thus, by designing the power generator as that of a surface permanent magnet type, it is not only possible to accommodate the power generator in a desired space in a compact manner, but also possible to produce a required output.

In the present invention, the rotor may include a cylindrical casing made from resinous material that is molded integrally with the magnetic body. By using an integrally formed component in the rotor, the number of components to make up the rotor can be kept minimum. The casing made from resinous material results in weight reduction, as compared to a rotor casing formed from metallic material. Further, for instance, the use of a molding process using a mold assembly can improve the fabrication accuracy of the rotor.

In the present invention, a rotation sensor configured to detect a rotational speed or a rotational angle of the rotational ring relative to the stationary ring may be provided. According to this feature, a rotational speed detected by the rotation sensor can be used for control of the power generator. A rotational angle can be used to calculate a rotational speed in a simple manner, and the calculated rotational speed can be used for control of the motor generator or used by an anti-lock brake system. Note that one or both of a rotational speed and a rotational angle may be required according to the setup of the system. For example, both a rotational angle and a rotational speed are required to implement torque control (current control) of the motor generator. Torque and a rotational speed are required to calculate consumed power and regenerated power. A rotational speed is required by the anti-lock brake system.

In a vehicle bearing assembly or a vehicle power assembly for being installed to a vehicle according to the invention, the mount surface, on an inboard side, with respect to the vehicle body may be an outboard side face of an undercarriage frame component of the vehicle.

According to this configuration, the power generator is designed in a direct drive format in which the rotor is mounted to the rotational ring of the wheel support bearing. This results in fewer components and a simplified structure of the power generator with resultant space saving. It also minimizes increase of the weight of the vehicle. The stator and a part or an entirety of the rotor are sized to extend radially inward of the peripheral section of the brake rotor. Further, an entirety of the power generator, excluding a mount part thereof to the hub flange, provided on an outboard side, of the rotational ring, is sized to be situated in an axial range between the hub flange and an outboard side face of the undercarriage frame component of the vehicle. This ensures that a space is available inside the brake rotor for installing the power generator and enables the power generator to be accommodated therein in a compact manner.

Since it is harder to produce rotor saliency in a synchronous motor of an outer rotor design as mentioned, a surface permanent magnet type—in particular, one whose rotor includes a cylindrical magnetic body made from soft magnetic material and permanent magnets on a peripheral surface of the magnetic body—can be used to yield a greater output with a smaller radial width of a rotor than that of an interior permanent magnet type. A surface permanent magnet type is more advantageous because magnet torque is the only factor in the surface permanent magnet type for generating rotational torque. It can yield the same output with a smaller, power generator diameter by increasing the magnet volume while reducing a radial thickness of a rotor. Thus, by designing the power generator as that of a surface permanent magnet type, it is not only possible to accommodate the power generator in a desired space in a compact manner, but also possible to produce a required output.

A vehicle according to the invention may include a wheel support bearing assembly as described. According to this configuration, the wheel support bearing assembly can be installed to a vehicle without modifying the undercarriage structure of a vehicle body. The vehicle power assembly can bring down fuel consumption.

Any combinations of at least two features, disclosed in the appended claims and/or the specification and/or the accompanying drawings should be construed as included within the scope of the present invention. In particular, any combinations of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like or corresponding parts throughout different figures, and:

DESCRIPTION OF EMBODIMENTS

Figure 1:
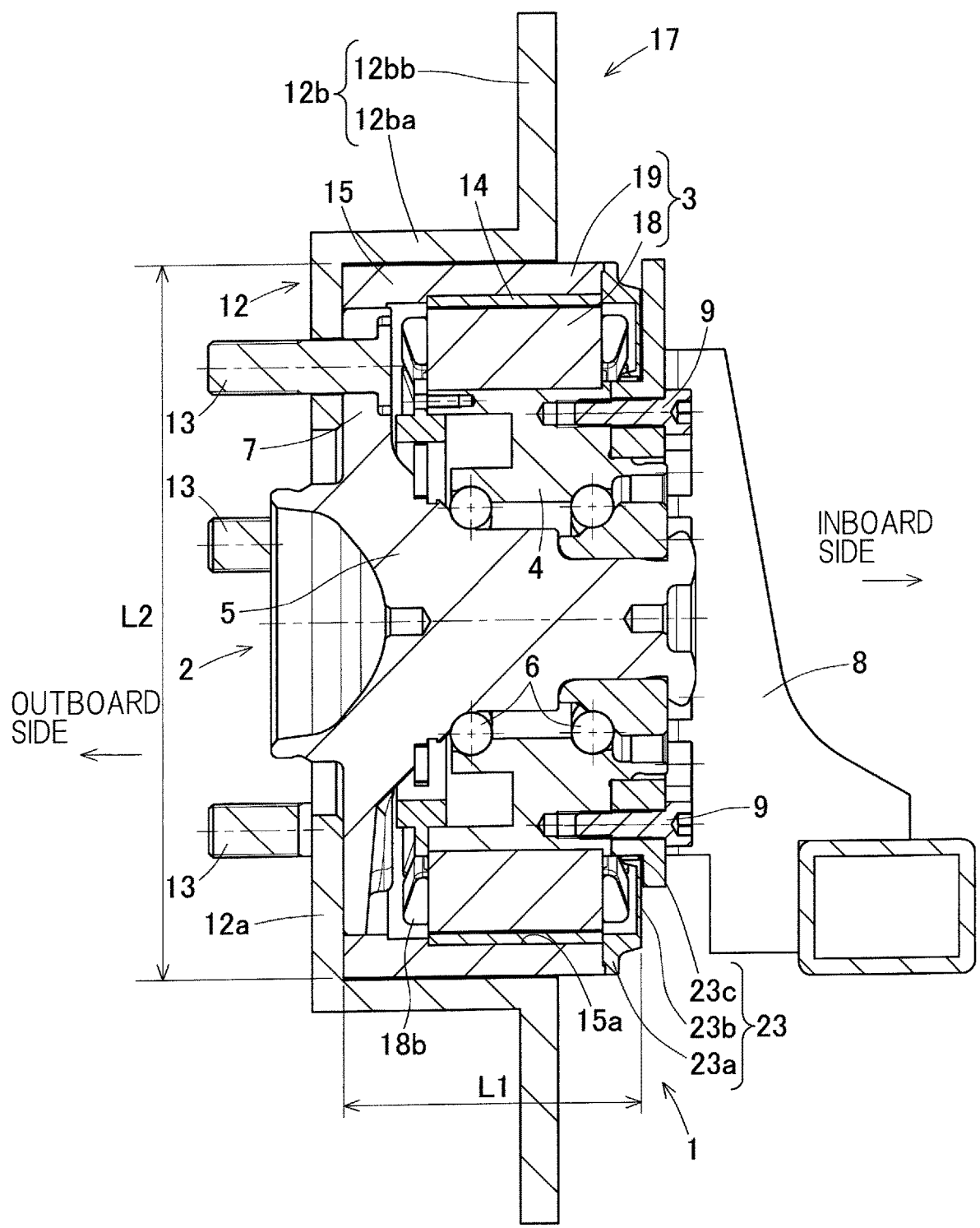
FIG. 1 shows a longitudinal cross sectional view of a wheel support bearing assembly according to a first embodiment of the invention.

A wheel support bearing assembly according to a first embodiment of the invention will be described in connection with FIGS. 1 to 4. As shown in FIG. 1, the wheel support bearing assembly 1 includes a wheel support bearing 2 and a power unit 3.

<Wheel Support Bearing 2>

The wheel support bearing 2 includes an outer ring 4 as a stationary ring, double-row rolling elements 6, and an inner ring 5 as a rotational ring. The inner ring 5 is rotatably supported via the double-row rolling elements 6 by the outer ring 4. Grease is sealed in a bearing space between the inner and outer rings 5 and 4. The inner ring 5 has a hub flange 7, at a portion of the inner ring 5 that projects outboard of the outer ring 4 in an axial direction. The outer ring 4—at a mount surface of the outer ring 4 with respect to a vehicle body, on an (inboard) end of the outer ring 4, that is distal to the hub flange 7—is mounted with bolts 9 to an undercarriage frame component 8 such as a knuckle to bear the weight of the vehicle body. Note that, with reference to an installed state of the wheel support bearing assembly 1 on a vehicle, an exterior side of the vehicle in a vehicle widthwise direction is defined as an outboard side, whereas a central side of the vehicle in a vehicle widthwise direction is defined as an inboard side herein.

A rim (not shown) of a wheel and a brake rotor 12 are attached, in a superposed manner in an axial direction, with hub bolts 13 to an outboard side face of the hub flange 7. A tire is fitted onto an outer periphery of the rim.

<Brake Unit 17>

Figure 2:
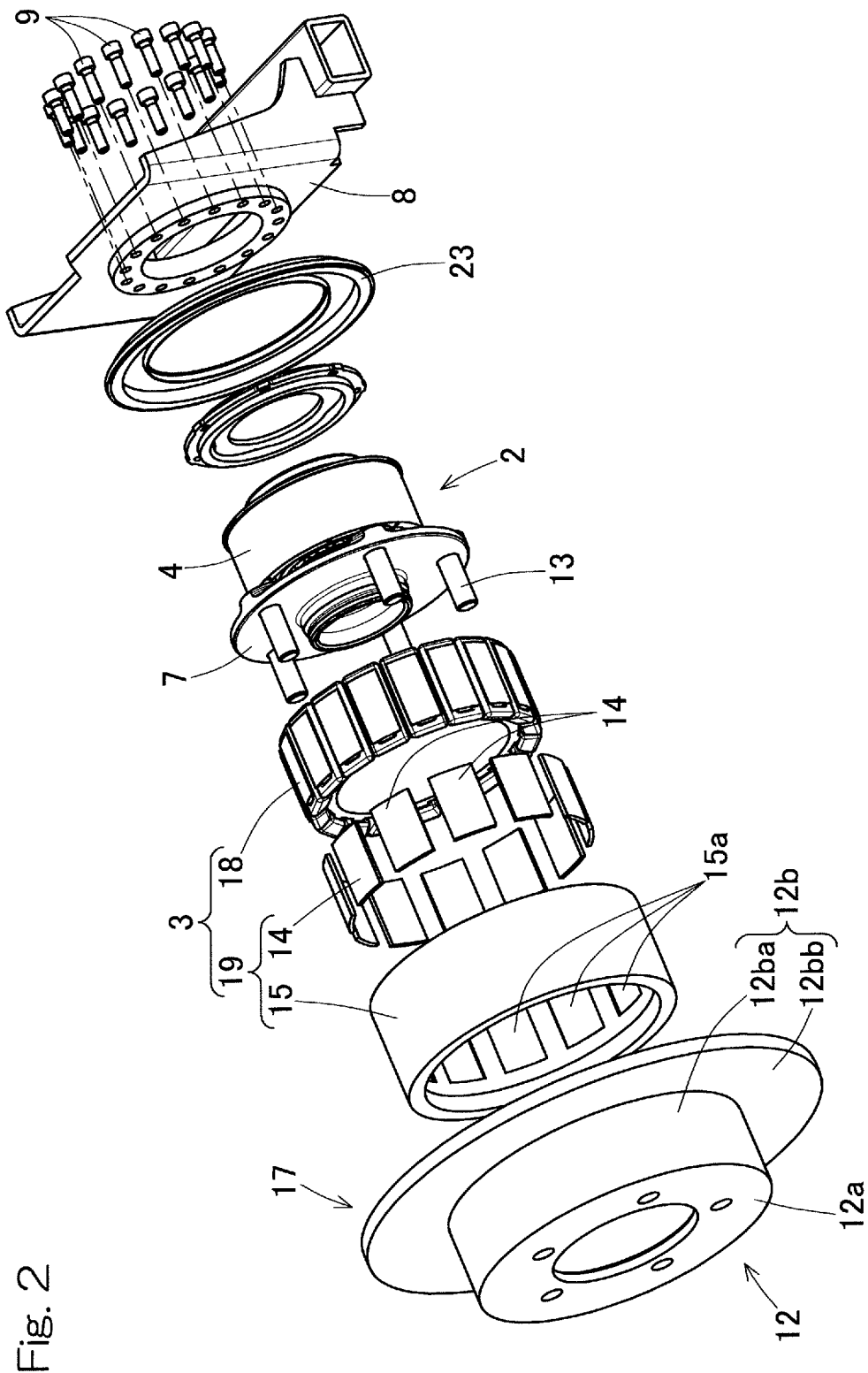
FIG. 2 shows an exploded perspective view of the wheel support bearing assembly.
Figure 21:
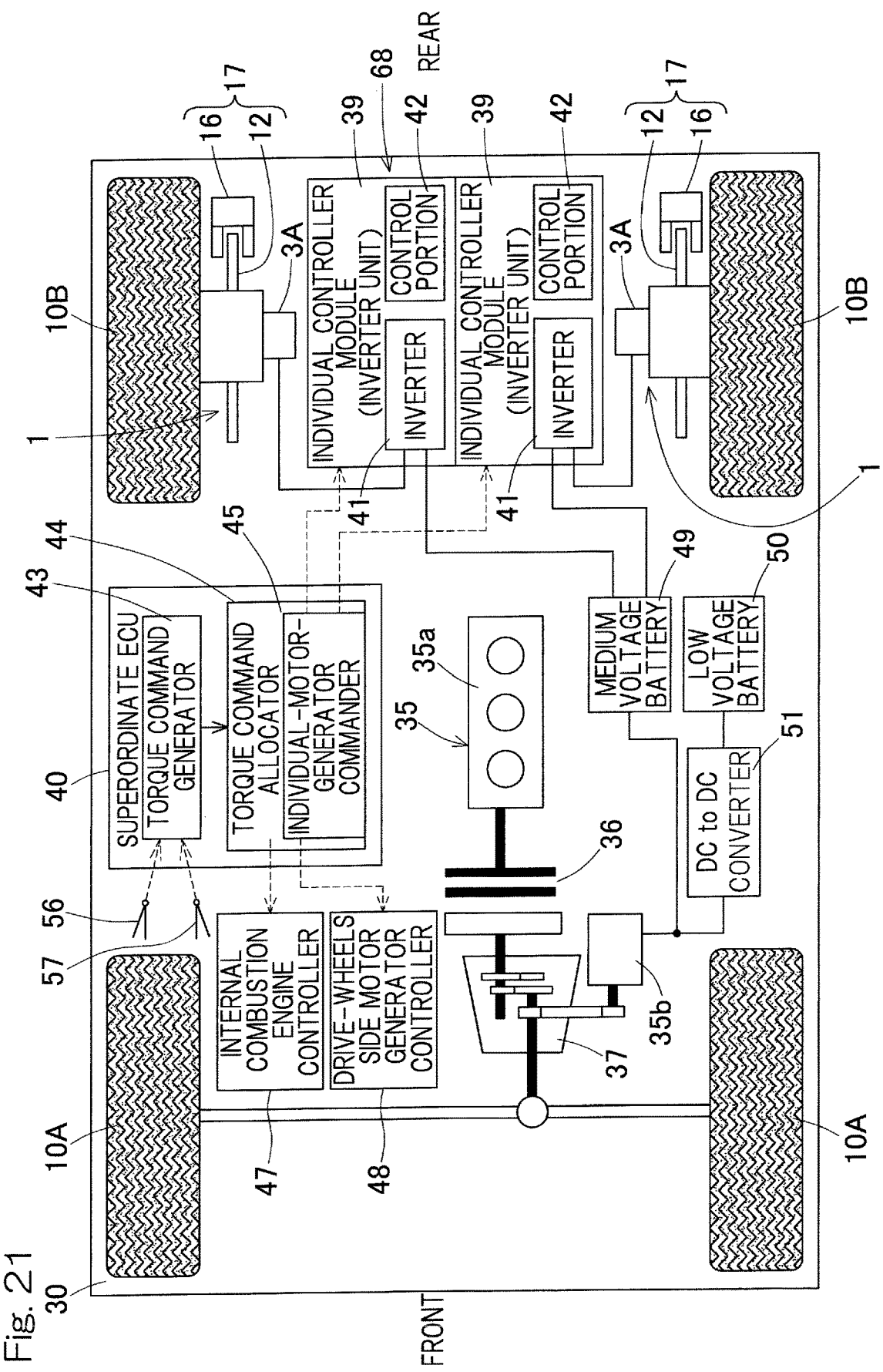
FIG. 21 shows a block diagram illustrating the concept configuration of a vehicular system for a vehicle with the wheel support bearing assemblies according to any one of the first to seventh embodiments.

As shown in FIG. 2, a brake unit 17 is a friction brake that includes the disc-shaped brake rotor 12 and a brake caliper 16 (FIG. 21). The brake rotor 12 includes a planar section 12a and a peripheral section 12b. The planar section 12a is an annular and planar piece that is superposed on the hub flange 7. The peripheral section 12b extends peripherally of the outer ring 4 from the planar section 12a. The peripheral section 12b includes a cylindrical segment 12ba extending inboard, in a cylindrical manner, from an outer peripheral edge of the planar section 12a and a planar segment 12bb extending radially outward, in a planar manner, from an inboard end of the cylindrical segment 12ba.

As can be understood from FIG. 1, the brake caliper includes frictional pads (not shown) that clamp against the planar segment 12bb of the brake rotor 12. The brake caliper is attached to the undercarriage frame component 8. The brake caliper may be a hydraulic type or a mechanical type, and alternatively, may be electric-motorized.

<Power Unit 3, etc.>

The power unit 3 in the present example is a drive-assist, motor generator which can generate power from rotation of a wheel and receive power to drive the wheel into rotation. The power unit 3 includes a rotor 19 mounted to the hub flange 7 of the inner ring 5 and a stator 18 mounted to an outer peripheral surface of the outer ring 4. The power unit 3 is that of an outer rotor design in which the rotor 19 is located radially outward of the stator 18. The power unit 3 is also designed in a direct drive format in which the rotor 19 of the power unit 3 is mounted to the inner ring 5 that serves as a rotational ring of the wheel support bearing 2.

<Example Configuration of SPM Motor>

Figure 3:
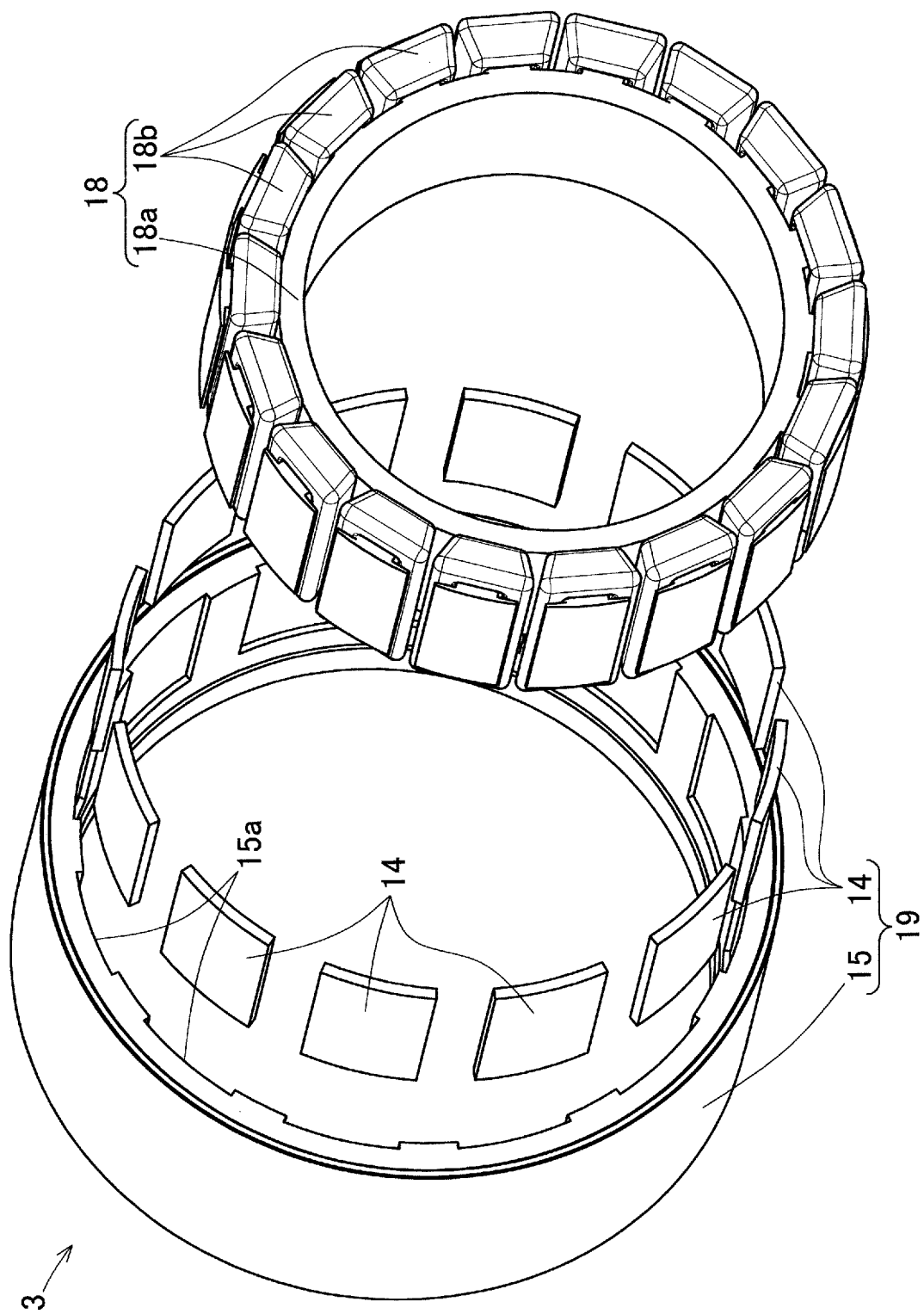
FIG. 3 shows an exploded perspective view of a power unit of the wheel support bearing assembly.

As shown in FIG. 3, the power unit 3 is a surface permanent magnet motor—that is, an SPM (Surface Permanent Magnet) synchronous motor (or an SPMSM (Surface Permanent Magnet Synchronous Motor))—of an outer rotor design. Different types of stator windings for a synchronous motor, including distributed winding and concentrated winding, can be used for the stator 18.

As shown in FIG. 3, the stator 18 includes a core 18a and coils 18b wound around respective teeth of the core 18a. For example, the core 18a is formed of an electrical steel sheet, a compressed powder magnetic core, or amorphous alloy, etc. The rotor 19 includes an outer shell magnetic body 15, which is made from soft magnetic material and forms an outer shell of the power unit 3, and a plurality of permanent magnets 14 that are arranged on an inner peripheral surface of the outer shell magnetic body 15. The outer shell magnetic body 15 has a cylindrical shape that is coaxial to the inner ring 5 (FIG. 1) and is made of one-piece soft magnetic material (metallic component). The outer shell magnetic body 15 also functions as a casing of the power unit 3.

Where a velocity changes as is the case with a vehicle, it is common to use an electrical steel sheet or a compressed powder magnetic core in order to address iron loss in a rotor that occurs as magnetic flux changes. Further, even where a motor is driven in high speed rotation, it is necessary for a rotor and a stator to be made of an electrical steel sheet or a compressed powder magnetic core, etc. to prevent the occurrence of iron loss caused by increase in power frequency. Iron loss is classified into hysteresis loss and eddy current loss. Hysteresis loss is proportional to power frequency, and eddy current loss increases as the square of power frequency.

The power unit 3, which is used as a motor in the present embodiment, is coupled to the wheel support bearing 2 (FIG. 1) in a direct drive format. Hence, the rotational speed of the motor is around 2000 $min^{-1}$ at the vehicle speed of as high as 200 km/h, though it depends on the tire diameter of the vehicle to which the motor is installed. Here, in the case of a 12-pole motor such as shown in FIG. 3, etc., for example, the frequency of power supplied to the motor operating at a rotational speed of 2000 $min^{-1}$ is 100 Hz. The power frequency may rise with the increase of the pole number. Yet, in the instant direct-drive configuration where the rotational speeds of the motor and a tire synchronize with each other, power frequency of roughly at most 500 Hz during operation is sufficient to meet required performance, thereby no significant iron loss is not generated. For this reason, the rotor 19 can be constructed using one-piece soft magnetic material (metallic component).

By thus constructing the rotor 19 with the use of one-piece soft magnetic material (metallic component), it is possible to ensure the strength of an outer rotor despite the inexpensive structure of the rotor 19. The rotor 19 can be produced through cutting or forging, etc. of a one-piece metallic component. Alternatively, the rotor 19 may be produced by preparing a plurality of split structures and securing these split structures together by means of, for example, welding or adhesive bonding, etc.

Figure 4:
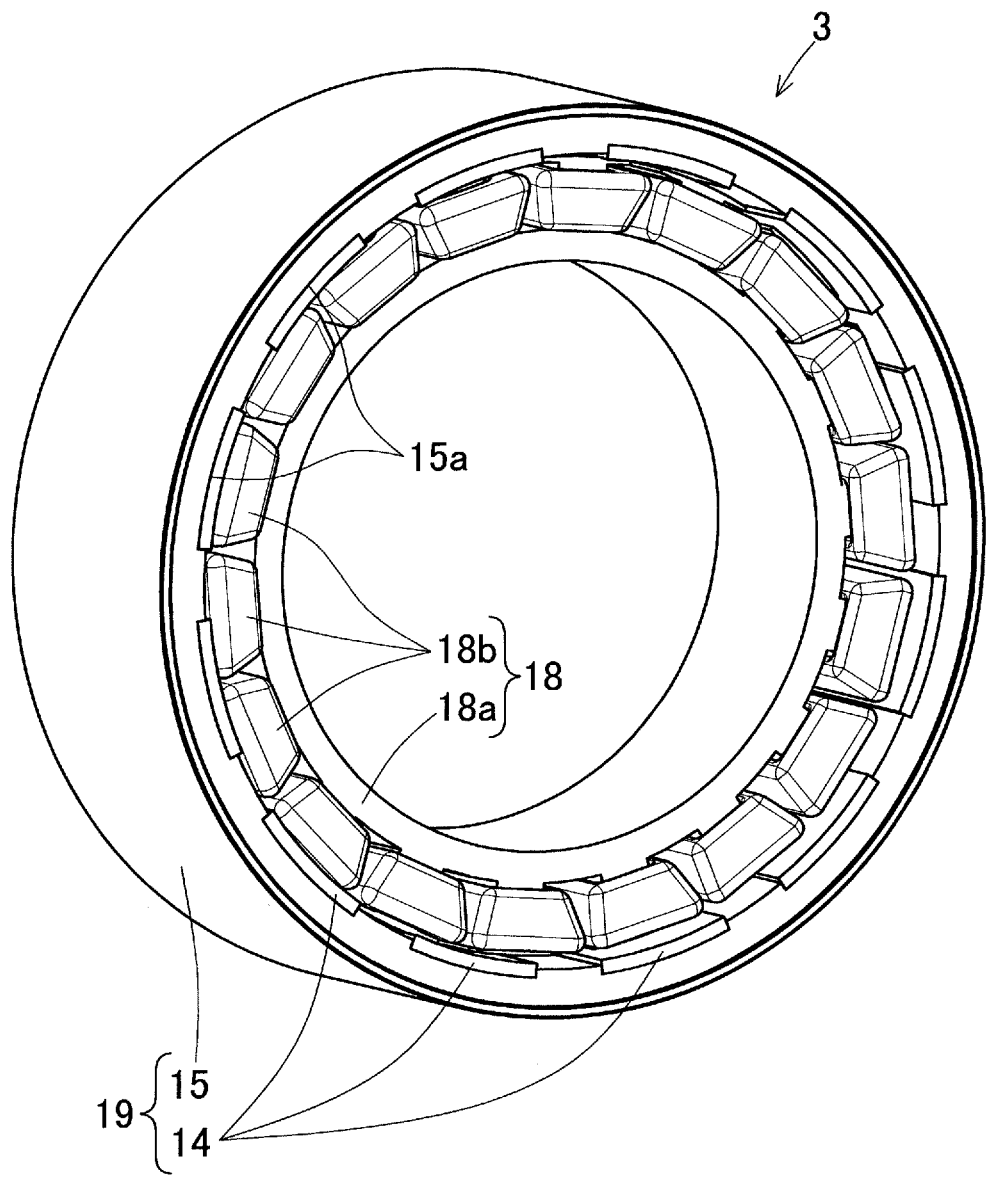
FIG. 4 shows a perspective view of the power unit in an assembled state.

The outer shell magnetic body 15 has a plurality of recesses 15*a* formed in an inner peripheral surface thereof with fixed intervals therebetween in a circumferential direction. As shown in FIG. 4, the permanent magnets 14 are fitted into the respective recesses 15*a* and are secured therein by means of adhesive bonding, etc. As shown in FIG. 1, the outer shell magnetic body 15 is mounted to the hub flange 7. An inner peripheral surface, on an outboard side, of the outer shell magnetic body 15 is secured to an outer peripheral surface of the hub flange 7 by means of, for example, fitting, welding or adhesive bonding, etc. In this case, the rotor 19 can be embodied without changing the axial position of the brake rotor 12. A larger portion of the space outside of the outer ring 4 can be exploited for installation of the power unit 3, as the axial size of the rotor 19 also does not need to be extended to allow the outer shell magnetic body 15 to be fixed.

A radial extension L2 of the entire power unit 3 is sized to be radially inward of the peripheral section 12*b* of the brake rotor 12. Further, an entirety of the power unit 3, excluding a mount part thereof to the hub flange 7, is sized to be situated in an axial range L1 between the hub flange 7 and a mount surface, on an inboard side, of the wheel support bearing 2 with respect to a vehicle body. That is, the power unit 3 is sized to be within a radial range between the peripheral section 12*b* of the brake rotor 12 and an outer periphery of the outer ring 4, while a part (an outboard half) of the power unit 3 is sized for the axial range L1 to be inside of the cylindrical segment 12*ba* of the peripheral section 12*b* of the brake rotor 12.

<Seal Structure>

An inboard end of the outer shell magnetic body 15 is provided with an annular seal member 23 to prevent the entry of moisture and foreign matters into the power unit 3 and the wheel support bearing 2. The seal member 23 is configured to seal an open area between the outer shell magnetic body 15 and the undercarriage frame component 8, and slindingly contacts in a radial direction with a part of the undercarriage frame component 8. The annular seal member 23 includes a seal main body 23*a*, an upright part 23*b* and a lip 23*c*, with these seal main body 23*a*, upright part 23*b* and lip 23*c* being integrally formed. The seal main body 23*a* is securely attached to an inboard end of the outer shell magnetic body 15 to prevent the entry of moisture and foreign matters around the open area. The upright part 23*b* extends radially inward from an inner peripheral surface, on an inboard side, of the seal main body 23*a*. A certain gap is defined between an inboard side face of the upright part 23*b* and the undercarriage frame component 8. The gap can act to further prevent the entry of foreign matters and so on. The lip 23*c* is formed so as to project from an inner peripheral tip edge of the upright part 23*b*. The lip 23*c* can further ensure that the entry of foreign matters and so on is prevented.

Advantageous Effects

According to the abovementioned wheel support bearing assembly 1, the power unit 3 is designed in a direct drive format in which the rotor 19 of the power unit 3 is mounted to the inner ring 5 of the wheel support bearing 2. This results in fewer components and a simplified structure of the power unit 3 with resultant space saving. It also minimizes increase of the weight of the vehicle. The output of a motor is determined substantially by the volume of the motor, provided that the input power is fixed and the same components of the motor are used. Therefore, the larger the volume that makes up a motor in design is, the more desirable it is for yielding a greater motor output.

In the instant configuration, a radial extension L2 of the entire power unit 3 is sized to be radially inward of the peripheral section 12*b* of the brake rotor 12, and further, an entirety of the power unit 3, excluding a mount part thereof to the hub flange 7, is sized to be situated in an axial range L1 between the hub flange 7 and a mount surface, on an inboard side, of the wheel support bearing 2 with respect to a vehicle body. This ensures that a space is available inside the brake rotor 12 for installing the power unit 3 and enables the power unit 3 to be accommodated therein in a compact manner.

Since the power unit 3 is that of an outer rotor design in which the rotor 19 is located radially outward of the stator 18, more surface areas can be made available, than is the case with an inner rotor design, for making the rotor 19 and the stator 18 face each other. In this way, the maximum output torque can be achieved in a limited space.

The outer shell magnetic body 15, which is made of one-piece soft magnetic material (metallic component) and also functions as a casing of the power unit 3, can lead to the following improved functionality (i) to (iv):

(i) a reduction in the number of components;
(ii) ensured strength of an outer rotor;
(iii) enhanced fabrication accuracy and assembly accuracy of an outer rotor; and
(iv) increased motor output.

Specifically, the outer shell magnetic body 15 not only functions as a casing but also acts to rotate itself as an outer rotor. Thus, it ensures the strength of an outer rotor and also achieves cost reduction. Further, it can realize fewer parts count as well as larger diameters of a rotor 19 and a stator 18, than that of a conventional structure of an outer rotor design, etc. In this way, a power unit 3 that can yield a greater output can be deployed in an inexpensive manner. Also, the outer shell magnetic body 15 made of a one-piece metallic component can achieve better fabrication accuracy and assembly accuracy of an outer rotor, than is the case with an outer shell magnetic body that is made by, for example, securing a plurality of split structures together by means of adhesive bonding, etc.

Further Embodiments

In the discussions that follow, the same reference signs in the preceding embodiments will be used to indicate features corresponding to those that are previously described with respect to these embodiments. The description of those features will not be repeated. Where only some features are described, the remainder of features should be treated to be the same as those in the preceding embodiments except where otherwise noted. Same features produce same advantageous effects. Aside from combinations of features that are particularly described in various embodiments, the different embodiments themselves can also be partially combined with each other, unless such combinations are notably inoperable.

Figure 5:
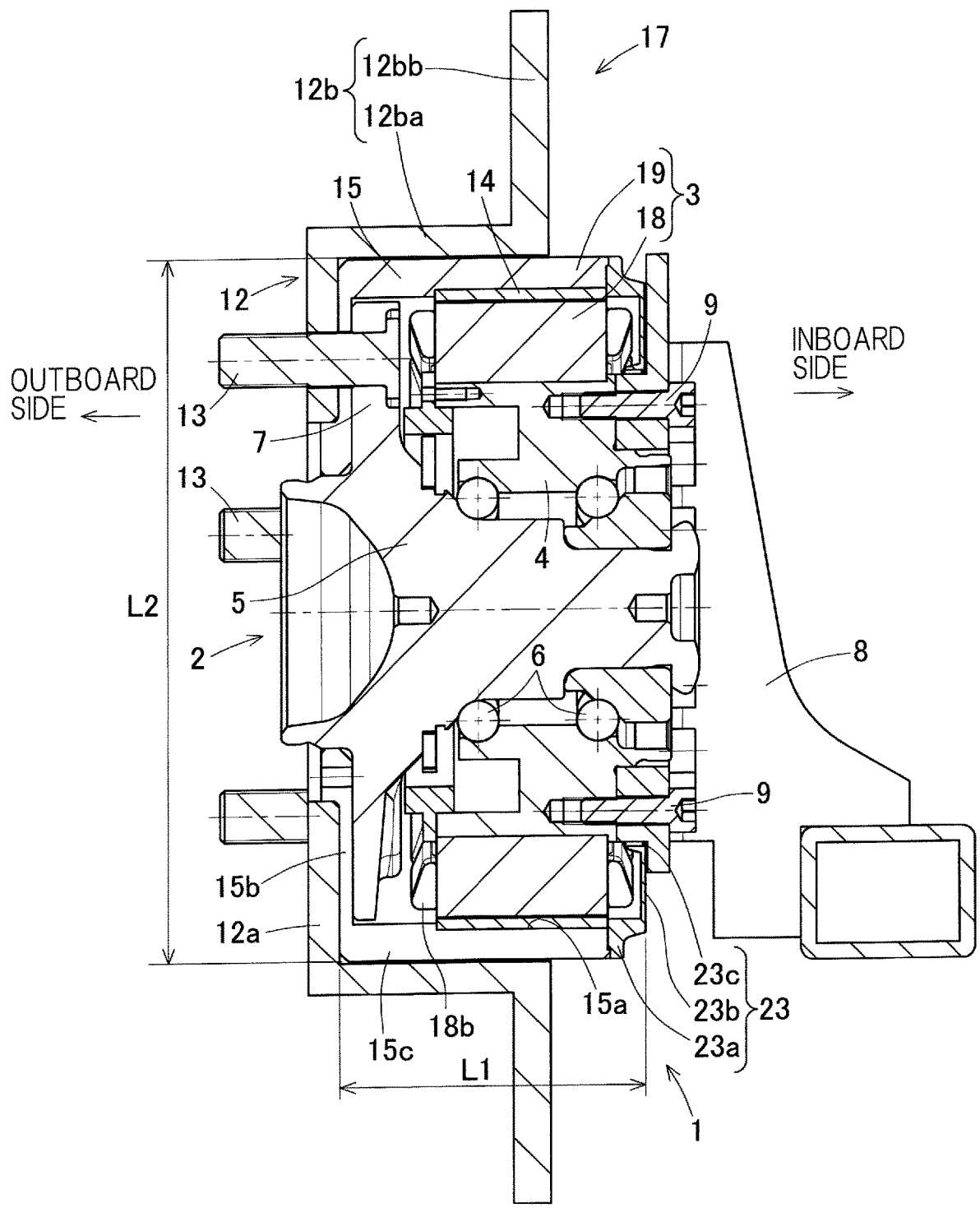
FIG. 5 shows a longitudinal cross sectional view of a wheel support bearing assembly according to a second embodiment of the invention.
Figure 6:
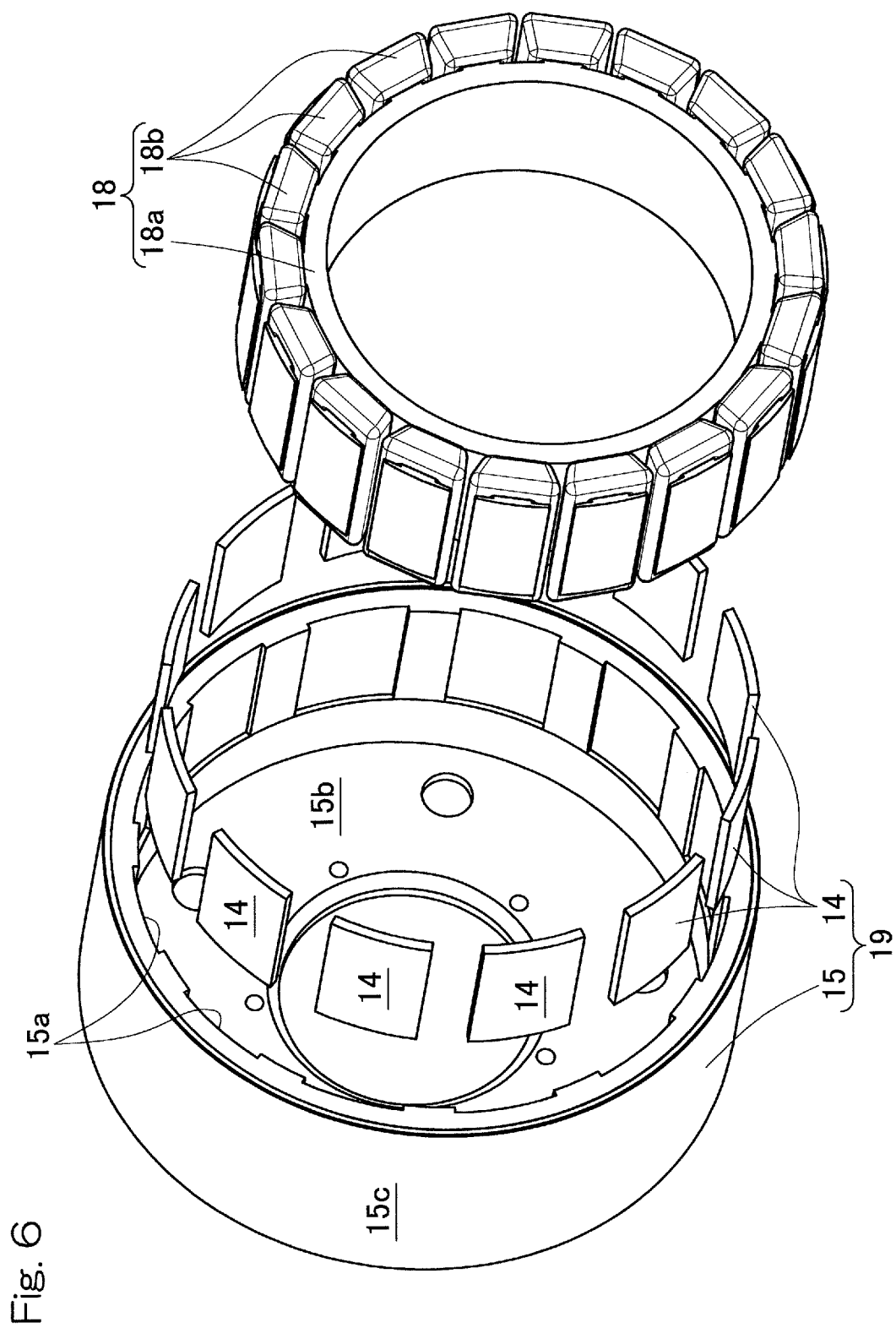
FIG. 6 shows an exploded perspective view of a power unit of the wheel support bearing assembly.
Figure 7:
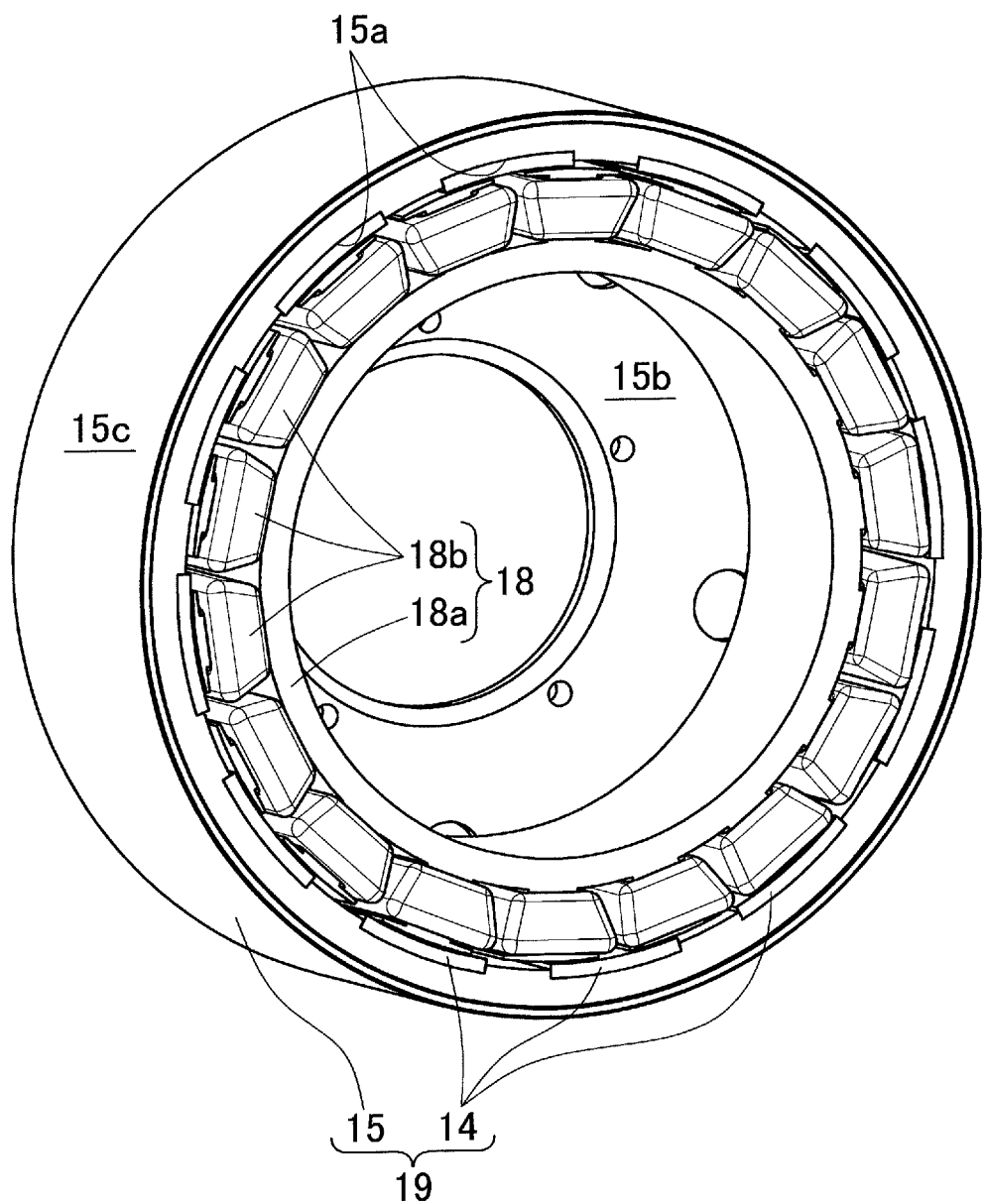
FIG. 7 shows a perspective view of the power unit in an assembled state.

As in a second embodiment shown in FIGS. 5 to 7, the outer shell magnetic body 15 may be of a structure having a blind cylindrical shape. The outer shell magnetic body 15 includes a magnetic body bottom section 15b and a magnetic body cylindrical section 15c. These magnetic body bottom section 15b and magnetic body cylindrical section 15c are formed as a single piece or as distinct pieces. As shown in FIG. 5, the magnetic body bottom section 15b is an annular and planar piece that is sandwiched between the planar section 12a of the brake rotor 12 and the hub flange 7. The magnetic body cylindrical section 15c extends inboard, in a cylindrical manner, from an outer peripheral edge of the magnetic body bottom section 15b.

According to this configuration, the magnetic body bottom section 15b of the outer shell magnetic body 15 is superposed on the hub flange 7 of the inner ring 5 and can thereby improve the rigidity of the outer shell magnetic body 15. This can enhance the rotational accuracy of the rotor 19.

In the embodiments, as the wheel support bearing 2 a so-called $3^{rd}$ generation hub bearing is employed, in which an inner ring 5 serving as a rotational ring includes a hub flange 7. The wheel support bearing 2 may be in the form of a so-called $2^{nd}$ generation hub bearing, in which an outer ring having double-row raceway surfaces is formed as a distinct piece from a mounting member to a knuckle, etc. The wheel support bearing 2 may also be a $1^{st}$ generation hub bearing, in which an inner ring having double-row raceway surfaces is constructed with a distinct piece from a hub flange part, when compared to the $2^{nd}$ generation hub bearing. The power unit 3 may be an IPM synchronous motor of an outer rotor design.

Figure 8:
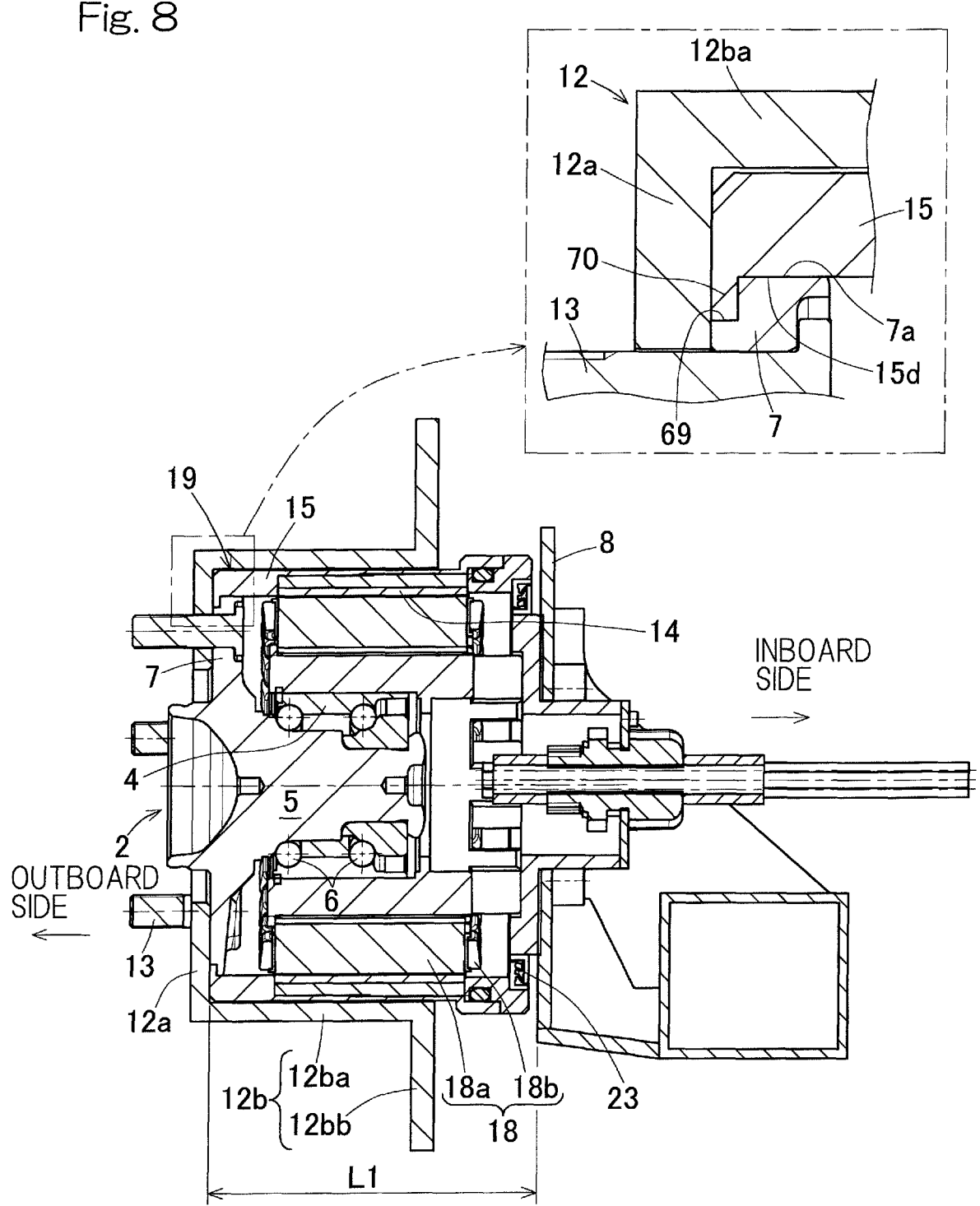
FIG. 8 shows a longitudinal cross sectional view of a wheel support bearing assembly according to a third embodiment of the invention.

As in a third embodiment shown in FIG. 8, a fitting engagement structure including an annular recess 69 and an annular projection 70 may be provided in order to implement a configuration where an inner peripheral surface, on an outboard side, of the outer shell magnetic body 15 of the rotor 19 is secured to an outer peripheral surface of the hub flange 7. The annular recess 69 is defined by forming a step on the periphery, on an outboard side, of an outer peripheral surface of the hub flange 7. The recess 69 is recessed radially inward, for a predetermined length, into an outer peripheral surface of the hub flange 7. The annular projection 70 that fits into the recess 69 is defined on an inner peripheral surface, on an outboard side, of the outer shell magnetic body 15.

In a fittedly engaged state of these recess 69 and projection 70 that are fitted to each other, a tip end surface of the projection 70 is fittedly secured to a bottom surface of the recess 69 while an inner peripheral surface 15d of the outer shell magnetic body 15 is also fittedly secured to an outer peripheral surface 7a of the hub flange 7. Moreover, in the fittedly engaged state, an outboard side face of the hub flange 7 (which is also referred to as a "hub flange face") is substantially flush with an outboard side face of the outer shell magnetic body 15, and these faces are in abutment with the planar section 12a of the brake rotor 12.

According to this configuration, an inner peripheral surface 15a, on an outboard side, of the outer shell magnetic body 15 of the rotor 19 is secured to an outer peripheral surface 7a of the hub flange 7. Thus, the axial size of the rotor 19 can be made shorter than is the case with a configuration (FIG. 5) where the outer shell magnetic body 15 is supported on the hub flange face. Also, owing to the provision of the fitting engagement structure to fittedly engage the recess 69 and the projection 70 with each other, the axial position of the rotor 19 can be fixed relative to the hub flange 7. Further, by fittedly securing a tip end surface of the projection 70 to a bottom surface of the recess 69 while also fittedly securing an inner peripheral surface 15d of the outer shell magnetic body 15 to an outer peripheral surface 7a of the hub flange 7 (fittedly securing two sets of surfaces on a radially inner side and a radially outer side, respectively), the positioning precision of the rotor 19 in a radial direction can also be improved.

Although not shown, a cylindrical, rotary casing may be provided with a magnetic body thereon and also with SPM permanent magnets attached to an inner peripheral surface of the magnetic body. In the case of such a configuration, an inner peripheral surface, on an outboard side, of the rotary casing may be secured to an outer peripheral surface of the hub flange. A fitting engagement structure including a recess and an annular projection may be provided to the outer peripheral surface of the hub flange and the inner peripheral surface, on an outboard side, of the rotary casing.

The recess may be defined in an inner peripheral surface of the outer shell magnetic body 15 while the projection that fits into the recess may be provided on an outer peripheral surface of the hub flange 7. Although in the third embodiment of FIG. 8, the recess 69 and the projection 70 are annular in shape, one or more recesses and projections may be defined in a circumferential direction. An adhesive agent, etc. may be applied to one or both of the fitting engagement structure including the recess 69 and the projection 70 and a fitting engagement structure between an outer peripheral surface 7a of the hub flange 7 and an inner peripheral surface 15d of the outer shell magnetic body 15.

A wheel support bearing assembly or vehicle power assembly according to a fourth embodiment of the invention will be described in connection with FIGS. 9 to 15. A vehicle power assembly can also be denoted as a "wheel support bearing assembly." As shown in FIG. 9, the vehicle power assembly 1 includes a wheel support bearing 2 and a motor generator (power unit) 3 which is a power generator serving also as an electric motor, as in the first embodiment.

<Wheel Support Bearing 2>

Figure 9:
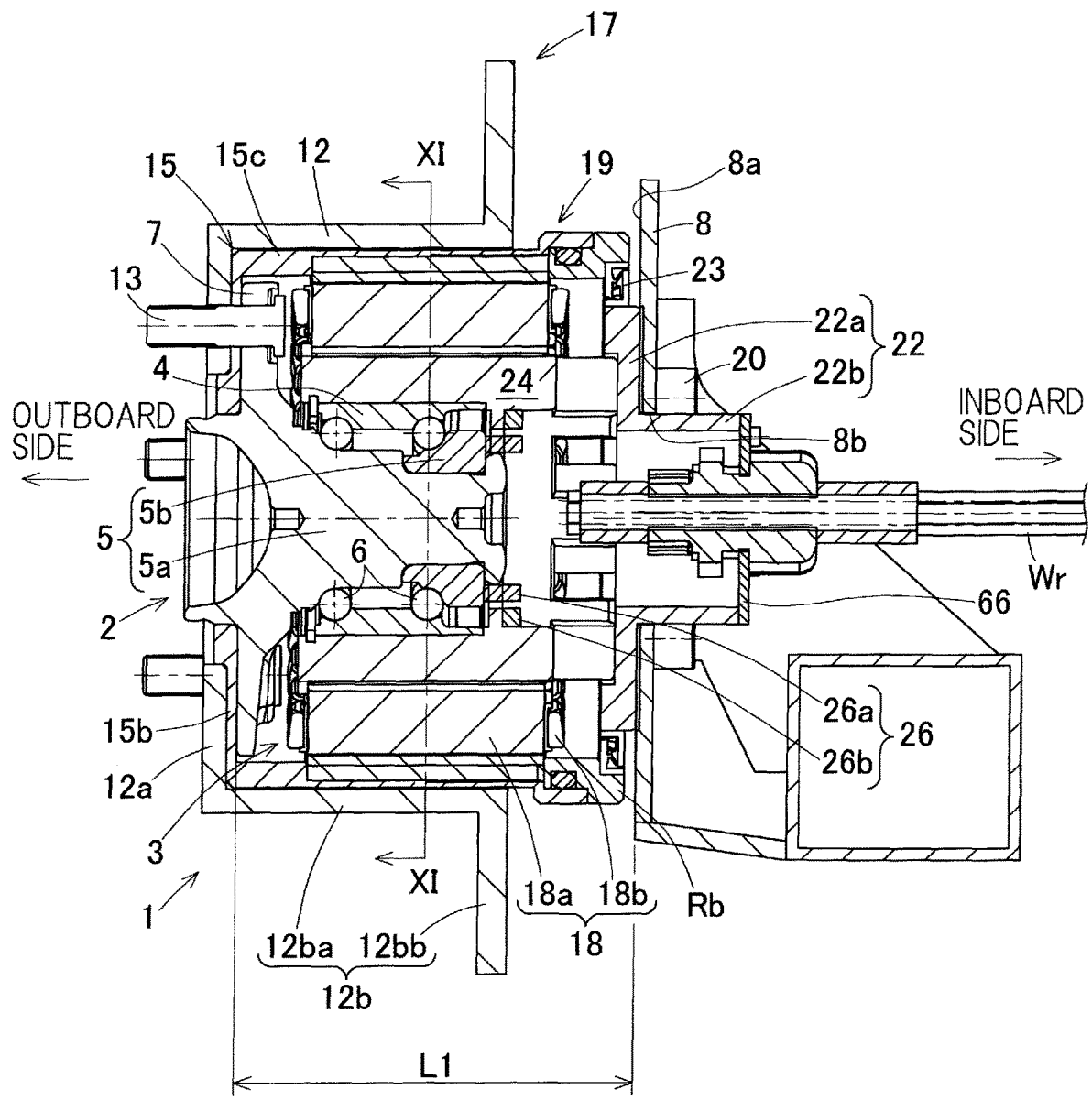
FIG. 9 shows a longitudinal cross sectional view of a wheel support bearing assembly according to a fourth embodiment of the invention.

The vehicle power assembly shown in FIG. 9 has a configuration comparable to that of FIG. 1 which illustrates the first embodiment. The same or corresponding parts are indicated with the same reference signs, and their particular description will not be repeated.

<Brake Unit 17>

Figure 10:
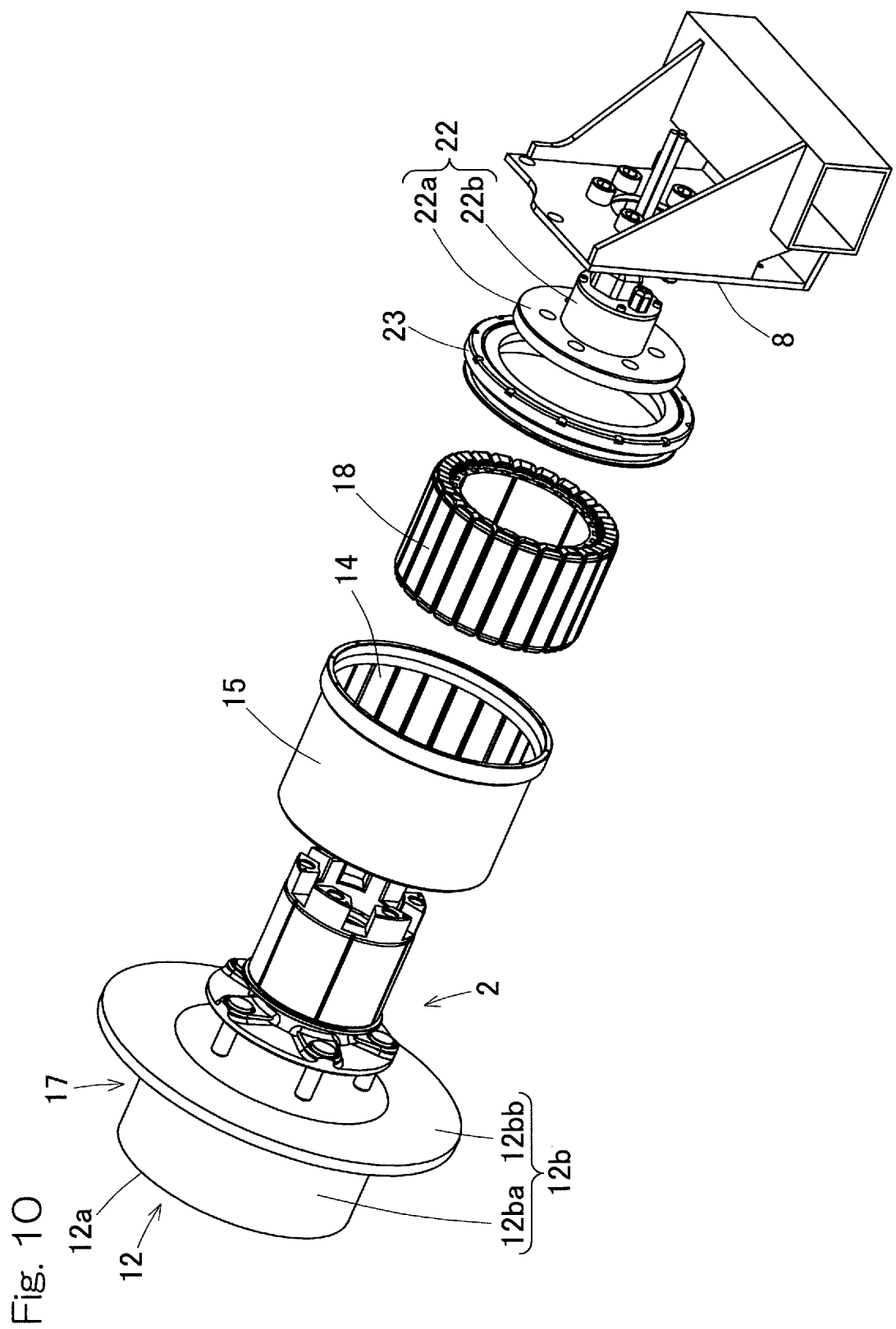
FIG. 10 shows an exploded perspective view of the wheel support bearing assembly.

The brake unit 17 shown in FIG. 10 also has a configuration corresponding to that of FIG. 2 which illustrates the first embodiment. Its particular description will not be repeated.

<Motor Generator 3, etc.>

The motor generator 3 in the present example also has a configuration comparable to that of the power unit 3 described with respect to the first embodiment. Its particular description will not be repeated.

As shown in FIG. 9, the stator 18 and an entirety of the rotor 19 of the motor generator 3 are sized to extend radially inward of the peripheral section 12b of the brake rotor 12. Further, an entirety of the motor generator 3, excluding a mount part thereof to the hub flange 7, is sized to be situated in an axial range L1 between the hub flange 7 and an outboard side face 8a of the undercarriage frame component 8.

<Example Configuration of SPM Motor>

Figure 12:
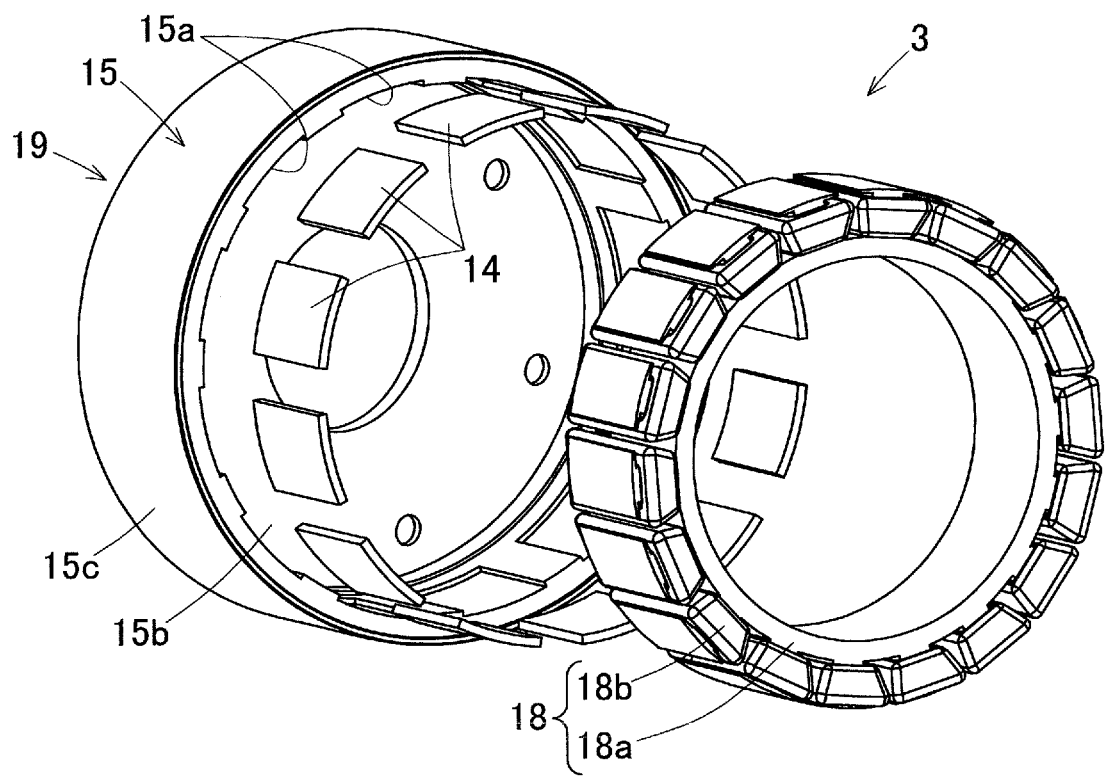
FIG. 12 shows an exploded perspective view of a power generator of the vehicle power assembly.

The motor generator 3 shown in FIG. 12 also has a configuration corresponding to that of FIG. 3. Its particular description will not be repeated.

The stator 18 also has a configuration corresponding to that of FIG. 3. While its particular description is not repeated here, note that the coils 18b are connected to a wire Wr, as shown in FIG. 9. A stator carrier member 24 is in abutment with an inner peripheral surface and an outboard end face of the stator 18 to carry the stator 18. The stator 18 is, for example, immobilized in a rotational direction and a radial direction to the stator carrier member 24 by means of force fitting or bolt fastening, etc.

Figure 15:
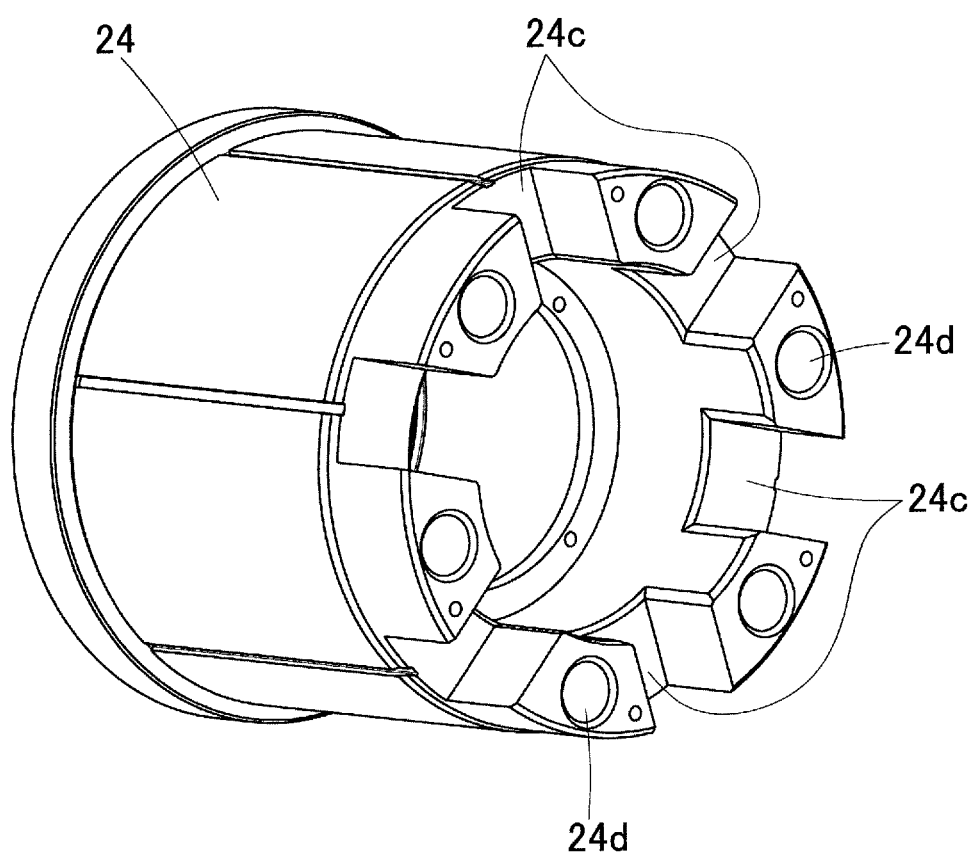
FIG. 15 shows a perspective view of an intermediate member of the vehicle power assembly, in isolation, as viewed from a face of a knuckle.

The stator carrier member 24 and the undercarriage frame component 8 are fastened to each other with bolts 20. An upright section 22a of a unit cover 22 is interposed between an inboard end face of the stator carrier member 24 and an outboard side face 8a of the undercarriage frame component 8. As shown in FIG. 15, in an inboard end face (adjacent to a face of the knuckle) of the stator carrier member 24 serving as an intermediate member, a plurality of (six in the instant example) communication openings 24c are provided in a circumferential direction to feed connection leads of the coils 18b (FIG. 9) from a radially outer side to a radially inner side of the stator carrier member 24. For instance, the plurality of communication openings 24c are defined by providing cutouts, with uniform, circumferential intervals therebetween, in an inboard end face of the stator carrier member 24. Note that the plurality of communication openings 24c may not necessarily be provided with uniform, circumferential intervals therebetween. They can be any communication openings so long as they allow passage of the wire Wr (FIG. 9) which is generally formed of three leads of U-phase, V-phase and W-phase. As shown in FIG. 9, the undercarriage frame component 8 has a through aperture 8b formed therein that allows insertion of an outer peripheral surface of a cylindrical section 22b of the unit cover 22. A plurality of insertion holes (not shown) for the bolts 20 are defined around the through aperture 8b.

As shown in FIGS. 9 and 15, the stator carrier member 24 has a plurality of (six in the instant example) female threads (not shown) 24d formed therein with uniform, circumferential intervals therebetween, so as to extend in an axial direction. The cover upright section 22a has through holes (not shown) formed therein so as to align in phase with the respective female threads 24d. The respective bolts 20 are inserted from an inboard side of the undercarriage frame component 8 into the insertion holes in the undercarriage frame component 8, pass through the through holes in the cover upright section 22a, and are screwed onto the respective female threads 24d in the stator carrier member 24.

Figure 11:
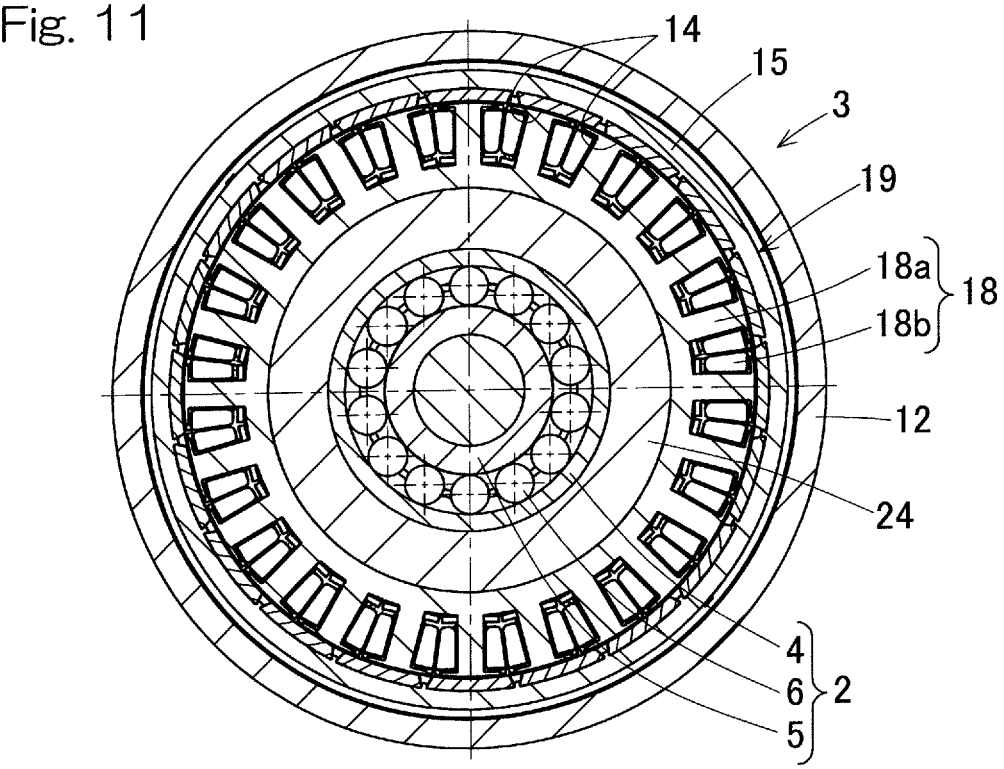
FIG. 11 shows a cross sectional view along a line XI-XI in FIG. 1.

As shown in FIG. 11, the rotor 19 includes an outer shell magnetic body (magnetic body) 15, which is made from soft magnetic material and forms an outer shell of the motor generator 3, and a plurality of permanent magnets 14 that are arranged on an inner peripheral surface (peripheral surface) of the outer shell magnetic body 15. The outer shell magnetic body 15 has a cylindrical shape that is coaxial to the inner ring 5, is made of one-piece soft magnetic material (metallic component), and also functions as a casing of the motor generator 3.

Where a velocity changes as is the case with a vehicle, it is common to use an electrical steel sheet or a compressed powder magnetic core in order to address iron loss in a rotor that occurs as magnetic flux changes. Further, where a motor is driven in high speed rotation, a rotor and a stator can be made of an electrical steel sheet or a compressed powder magnetic core, etc. to prevent the occurrence of iron loss caused by increase in power frequency. Iron loss is classified into hysteresis loss and eddy current loss. Hysteresis loss is proportional to power frequency, and eddy current loss increases as the square of power frequency.

The motor generator 3, which is used as a motor in the instant case, is coupled to the wheel support bearing 2 in a direct drive format. Hence, the rotational speed of the motor is around 2000 min$^{-1}$ at the vehicle speed of as high as 200 km/h, though it depends on the tire diameter of the vehicle to which the motor is installed. Here, in the case of a 12-pole motor such as shown in FIG. 5, etc., for example, the frequency of power supplied to the motor operating at a rotational speed of 2000 min$^{-1}$ is 100 Hz. The power frequency may rise with the increase of the pole number. Yet, in the instant, direct-drive configuration where the rotational speeds of the motor and a tire synchronize, power frequency of roughly at most 500 Hz during operation is sufficient to meet required performance, thereby significant iron loss is not generated. For this reason, the rotor 19 can be constructed using one-piece soft magnetic material (metallic component).

Figure 14:
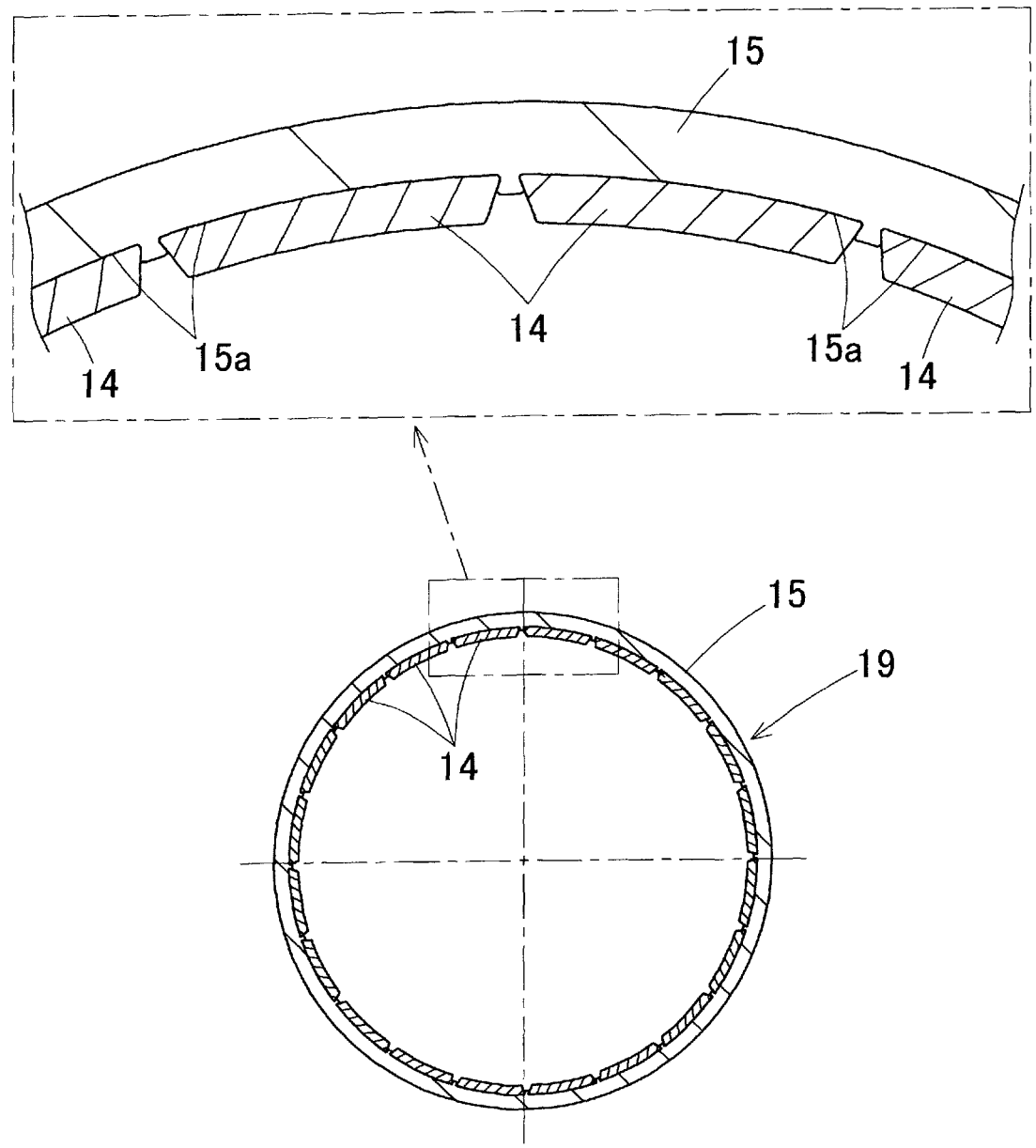
FIG. 14 shows a cross sectional view of a rotor of the power generator along a plane perpendicular to an axial direction.

By thus constructing the rotor 19 with the use of one-piece soft magnetic material (metallic component), it is possible to ensure the strength of an outer rotor despite the inexpensive structure of the rotor 19. The rotor 19 can be produced through cutting or forging, etc. of a one-piece metallic component. Alternatively, the rotor 19 may be produced by preparing a plurality of split structures and securing these split structures together by means of, for example, welding or adhesive bonding, etc. As shown in FIG. 14, the outer shell magnetic body 15 has a plurality of recesses 15a formed in an inner peripheral surface thereof with fixed intervals therebetween in a circumferential direction. The permanent magnets 14 are fitted into the respective recesses 15a and are secured therein by means of adhesive bonding, etc.

As shown in FIG. 12, the outer shell magnetic body 15 is of a structure having a blind cylindrical shape with a circumferential wall and a bottom wall. The outer shell magnetic body 15 includes a magnetic body bottom section 15b and a magnetic body cylindrical section 15c. These magnetic body bottom section 15b and magnetic body cylindrical section 15c are formed as a single piece or as distinct pieces.

As shown in FIG. 9, the magnetic body bottom section 15b is an annular and planar piece that is sandwiched between the planar section 12a of the brake rotor 12 and the hub flange 7. The magnetic body cylindrical section 15c extends inboard, in a cylindrical manner, from an outer peripheral edge of the magnetic body bottom section 15b. The recesses 15a (FIG. 12), into which the respective permanent magnets 14 (FIG. 12) are fitted, are formed in a portion of an inner peripheral surface of the magnetic body cylindrical section 15c, which portion is positioned at a center of the inner peripheral surface in an axial direction.

<Seal Structure>

As in the first embodiment, an annular seal member 23 that prevents the entry of moisture and foreign matters into the motor generator 3 and the wheel support bearing 2 is located between the outer shell magnetic body 15 and an outboard side face 8a of the undercarriage frame component 8. The seal member 23 includes annular seal plates and an elastic seal member, both of which oppose with each other. An annular, rotor-end ring member Rb is secured with bolts to an inner peripheral surface (end portion inner peripheral surface) and an end face, on an inboard side, of the outer shell magnetic body 15. An axial gap is defined between the rotor-end ring member Rb and an outboard side face 8a of the undercarriage frame component 8.

Figure 13:
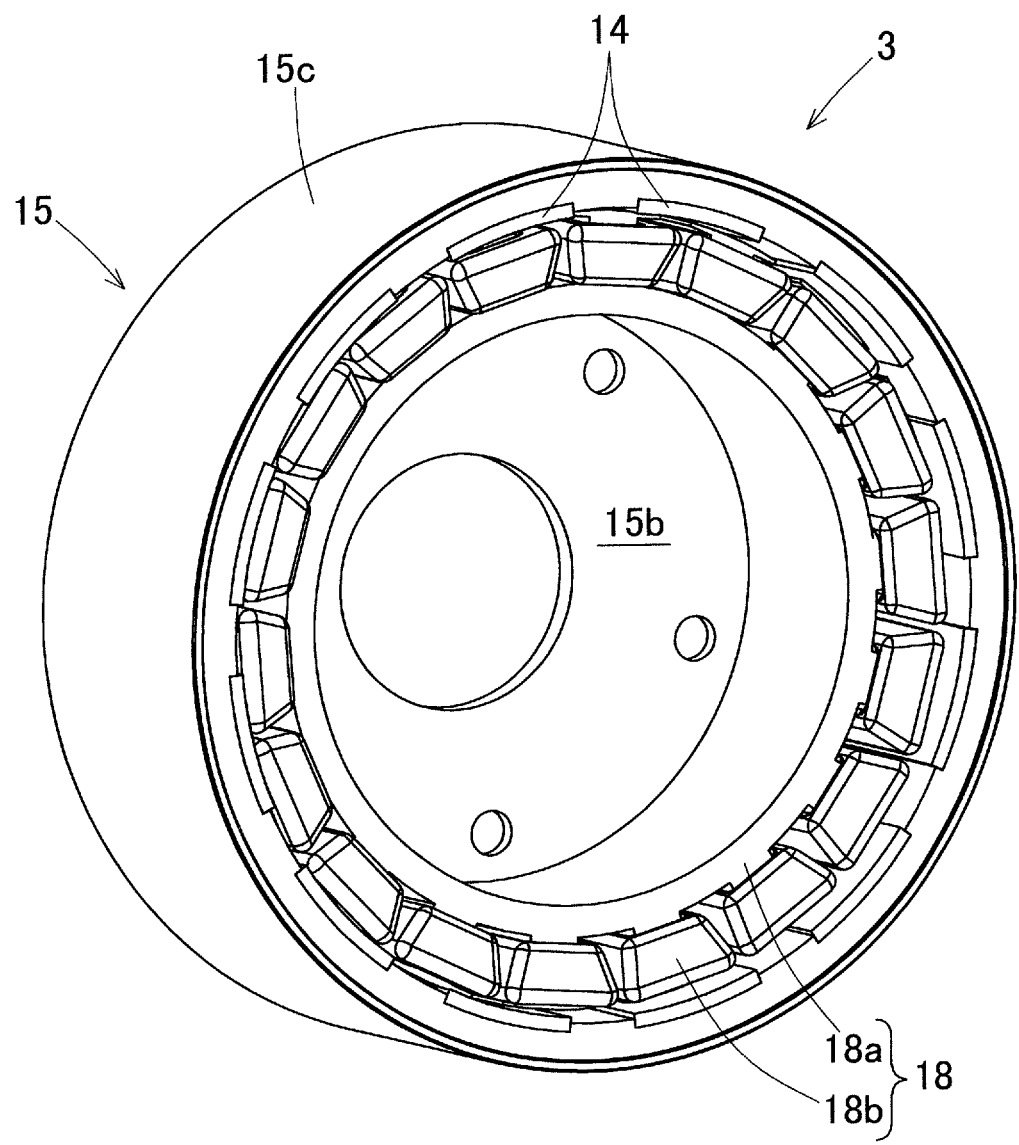
FIG. 13 shows a perspective view of the power generator in an assembled state.

Note that an annular groove is defined in an outer peripheral surface of the rotor-end ring member Rh, and an O-ring is arranged in this annular groove. The O-ring seals the surfaces of contact between the end portion inner peripheral surface of the outer shell magnetic body 15 and the rotor-end ring member Rb. The rotor-end ring member Rb also functions as a positioning member to position in an axial direction the permanent magnets 14 (FIG. 13) that are secured to the outer shell magnetic body 15 (FIG. 13).

<Rotation Sensor, etc.>

The vehicle power assembly 1 is provided with a rotation sensor 26. The rotation sensor 26 is located within a hollow space in the stator 18. The rotation sensor 26 detects a rotational speed or a rotational angle of the inner ring 5 relative to the outer ring 4, in order to control rotation of the motor generator 3. The rotation sensor 26 includes a sensor target 26a fixed to the inner ring 5, and a sensor part 26b attached to an inner peripheral surface of the stator carrier member 24 to sense the sensor target 26a. For instance, a resolver is used as the rotation sensor 26. Note that the rotation sensor 26 is not limited to a resolver. For example, any format such as an encoder, a pulsar ring, or a Hall sensor can be employed. A rotational angle can be used to calculate a rotational speed in a simple manner, and the calculated rotational speed can be used for control of the motor generator 3 or used by an anti-lock brake system (not shown). Note that one or both of a rotational speed and a rotational angle may be required according to the setup of the system. For example, both a rotational angle and a rotational speed are required to implement torque control (current control) of the motor generator 3. Torque and a rotational speed are required to compute consumed power and regenerated power. A rotational speed is required by the anti-lock brake system.

<Wiring, etc.>

A connector cover 66 that covers an inboard end of the cylindrical section 22b of the unit cover 22 is removably attached to this inboard end with a plurality of bolts. A so-called panel-mounted wire Wr is carried by the connector cover 66. A panel-mounted sensor connector (not shown), etc. is also carried by the connector cover 66.

<Advantageous Effects>

According to the abovementioned vehicle power assembly 1, the motor generator 3 is designed in a direct drive format in which the rotor 19 of the motor generator 3 is mounted to the inner ring 5 that serves as a rotational ring of the wheel support bearing 2. This results in fewer components and a simplified structure of the vehicle power assembly as a whole with resultant space saving. It also minimizes increase of the weight of the vehicle. The stator 18 and an entirety of the rotor 19 are sized to extend radially inward of the peripheral section 12b of the brake rotor 12, and further, an entirety of the motor generator 3, excluding a mount part thereof to the hub flange 7, is sized to be situated in an axial range L1 between the hub flange 7 and an outboard side face 8a of the undercarriage frame component 8. This ensures that a space is available inside the brake rotor 12 for installing the motor generator 3 and enables the motor generator 3 to be accommodated therein in a compact manner.

The motor generator 3 is that of a surface permanent magnet type in which the rotor 19 includes a cylindrical, outer shell magnetic body 15 made from soft magnetic material and permanent magnets 14 on an inner peripheral surface of the outer shell magnetic body 15. With such a surface permanent magnet type, a greater output can be yielded with a radial width of the rotor 19 that is shorter than that of an interior permanent magnet type. Generally speaking, it is harder to produce rotor saliency (variation of magnetic resistance over a complete circumference of a rotor) in a motor type of an outer rotor design. This leads to insufficient reluctance torque in the case of an interior permanent magnet type, where reluctance torque is one of the factors for generating rotational torque.

A surface permanent magnet type is more advantageous because magnet torque is the only factor in the surface permanent magnet type for generating rotational torque, thereby to yield the same output with a smaller, motor generator diameter by increasing the magnet volume while reducing a radial thickness of a rotor. Also, by employing a surface permanent magnet type, loss can be minimized and iron loss hardly occurs. Thus, by designing the motor generator 3 as that of a surface permanent magnet type, it is not only possible to accommodate the motor generator 3 in a desired space in a compact manner, but also possible to produce a required output.

Since the motor generator 3 is of an outer rotor design in which the rotor 19 is located radially outward of the stator 18, more surface areas can be made available, than is the case with an inner rotor design, for making the rotor 19 and the stator 18 face each other. In this way, the maximum output can be achieved in a limited space. Also, the magnetic body bottom section 15b of the outer shell magnetic body 15 is superposed on the hub flange 7 of the inner ring 5, thereby to improve the rigidity of the outer shell magnetic body 15. This can enhance the rotational accuracy of the rotor 19.

The outer shell magnetic body 15, which is made of one-piece soft magnetic material (metallic component) and also functions as a casing of the motor generator 3, can lead to the following improved functionalities (i) to (iv):

(i) a reduction in the number of components;
(ii) ensured strength of an outer rotor;
(iii) enhanced fabrication accuracy and assembly accuracy of an outer rotor; and
(iv) increased motor output.

Specifically, the outer shell magnetic body 15 not only functions as a casing but also acts to rotate itself as an outer rotor. It ensures the strength of an outer rotor and also achieves cost reduction. Further, it can realize fewer parts count as well as larger diameters of a rotor 19 and a stator 18, than that of a conventional structure of an outer rotor design, etc. In this way, a motor generator 3 that can yield a greater output can be deployed in an inexpensive manner. Also, the outer shell magnetic body 15 made of a one-piece metallic component can achieve better fabrication accuracy and assembly accuracy of an outer rotor, than is the case with an outer shell magnetic body that is made by, for example, securing a plurality of split structures together by means of adhesive bonding, etc.

Figure 16:
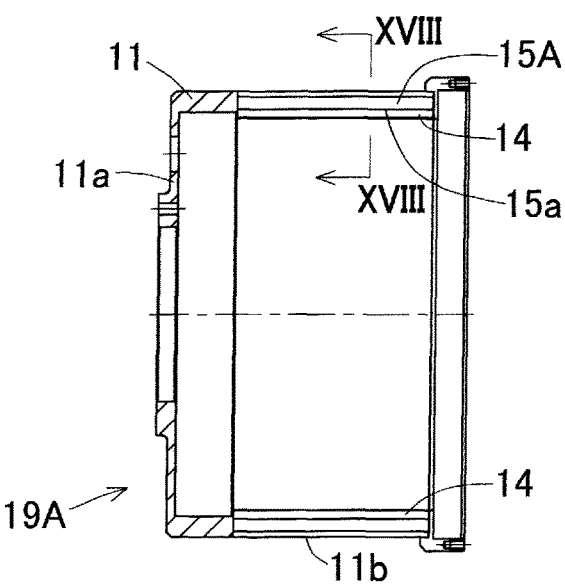
FIG. 16 shows a longitudinal cross sectional view of a rotor of a vehicle power assembly according to a fifth embodiment of the invention.
Figure 17:
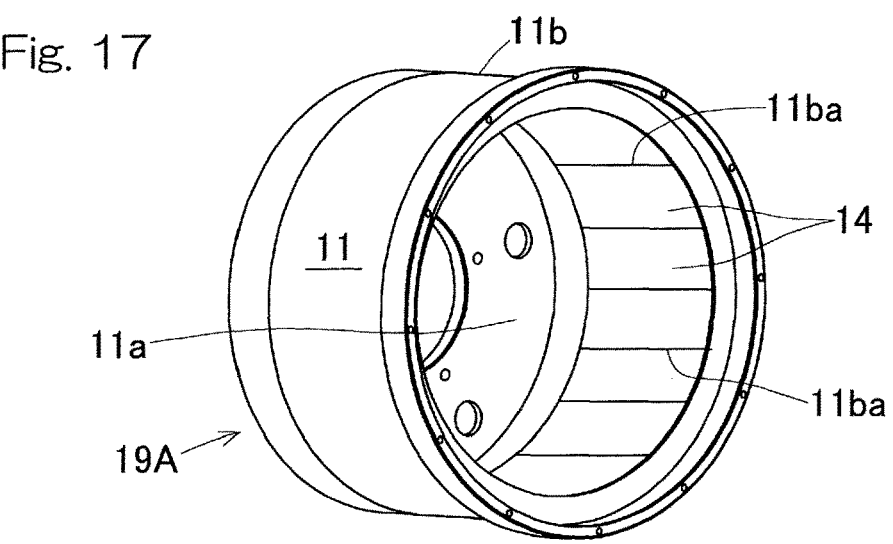
FIG. 17 shows a perspective view of the rotor.
Figure 18:
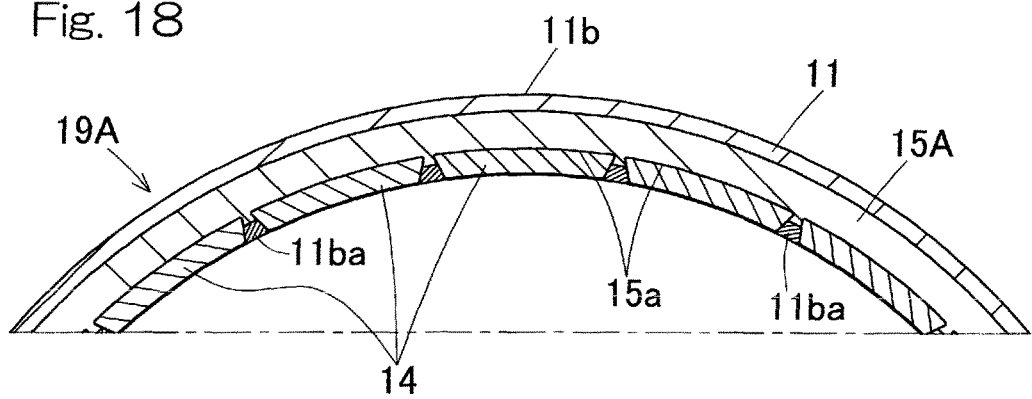
FIG. 18 shows an enlarged, fragmentary cross sectional view along a line XVIII-XVIII in FIG. 16.

As in a fifth embodiment shown in FIGS. 16 to 18, the rotor 19A may include a magnetic body 15A, a plurality of permanent magnets 14, and a cylindrical casing 11 made from resinous material that is molded integrally with the magnetic body 15A. The magnetic body 15A is cylindrical and made from soft magnetic material. The cylindrical magnetic body 15A has respective recesses 15*a* formed in an inner peripheral surface thereof, into which the permanent magnets 14 are fitted and secured. The casing 11 is of a structure having a blind cylindrical shape. The casing 11 includes a casing bottom section 11*a* and a casing cylindrical section 11*b*. For example, the casing 11 is molded integrally with the magnetic body 15A in an insert molding process, etc. in a mold assembly (not shown). The casing bottom section 11*a* is an annular and planar piece that is sandwiched between the planar section 12*a* (FIG. 9) of the brake rotor 12 (FIG. 9) and the hub flange 7 (FIG. 9).

The casing cylindrical section 11*b* extends inboard, in a cylindrical manner, from an outer peripheral edge of the casing bottom section 11*a*. The casing cylindrical section 11*b* includes a peripheral segment that covers an outer peripheral surface of the magnetic body 15A, and a plurality of protrusions 11*ba* that are located between the circumferentially neighboring permanent magnets 14 to hold in place the respective permanent magnets 14 (in other words, protrusions for detent purposes). As shown in FIG. 18, the protrusions 11*ba* extend in an axial direction and are also generally trapezoidal in cross section such that they are flared radially inward. Inner peripheral surfaces of the respective protrusions 11*ba* are generally at the same radial positions as inner peripheral surfaces of the permanent magnets 14. The protrusions 11*ba*, which are generally trapezoidal in cross section such that they are flared radially inward, can prevent the permanent magnets 14 from detaching from the magnetic body 15A.

According to the configuration of the fifth embodiment shown in FIGS. 16 to 18, where an integrally formed component is used in the rotor 19A, the number of components to make up the rotor 19A can be kept minimum. The casing 11 made from resinous material results in weight reduction, as compared to a rotor casing formed from metallic material. Further, for instance, the use of a molding process using a mold assembly can improve the fabrication accuracy of the rotor 19A. In particular, producing the rotor 19A in an insert molding process can reduce the number of steps for fixing the rotor 19A to the wheel support bearing 2. Note that, although not shown, a ring member could be inserted radially inward of the rotor 19A to keep the permanent magnets 14 held on the magnetic body 15A. This, however, increases the number of components, and moreover, the motor characteristics may drop when a material with low magnetic permeability is used for the ring member.

Figure 19:
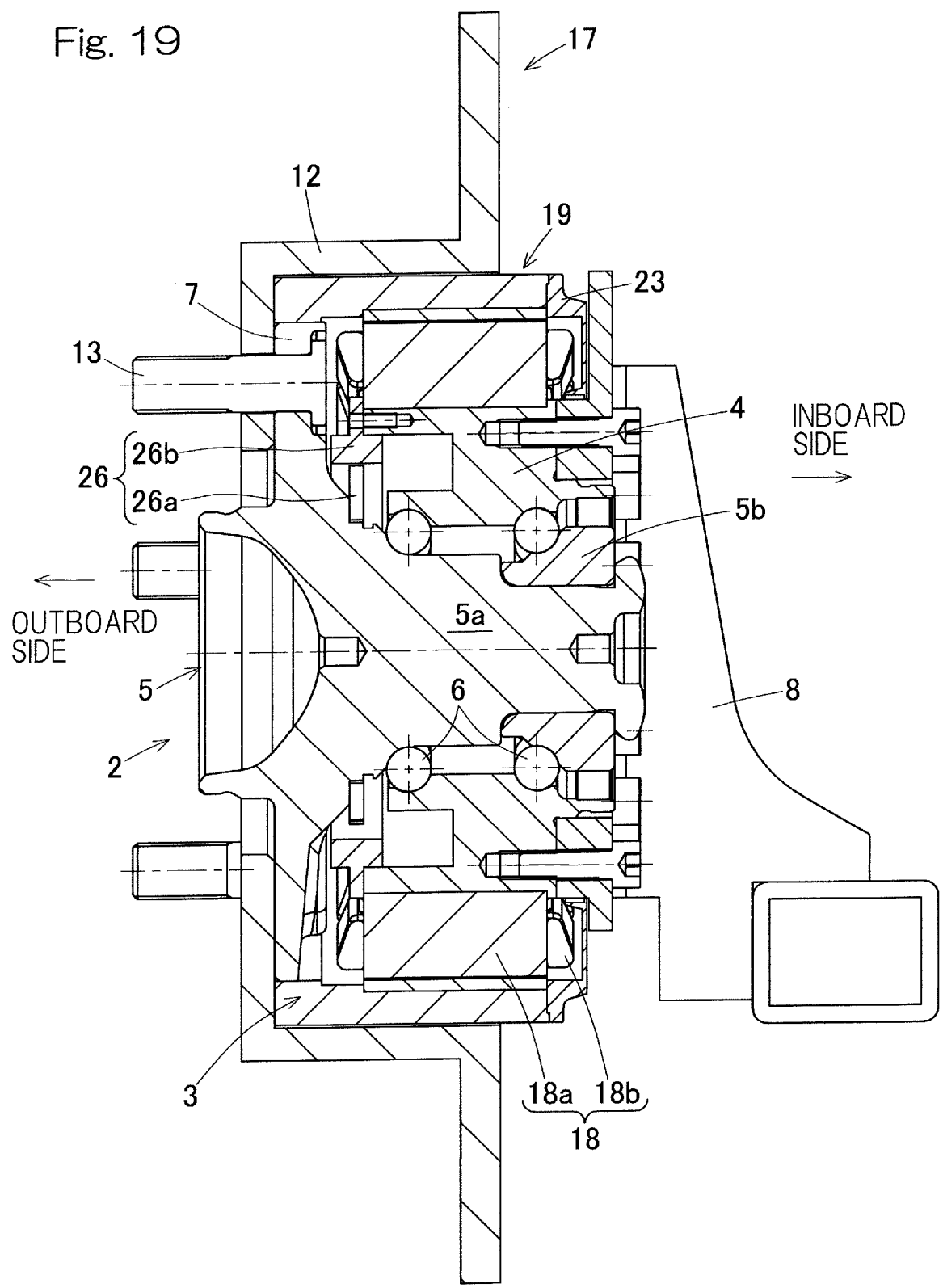
FIG. 19 shows a longitudinal cross sectional view of a part of a wheel support bearing assembly according to a sixth embodiment of the invention.

As in a sixth embodiment shown in FIG. 19, an inner peripheral surface, on an outboard side, of the cylindrical rotor 19 may be secured to an outer peripheral surface of the hub flange 7 by means of, for example, fitting, welding or adhesive bonding, etc. In this case, the rotor 19 can be embodied without changing the axial position of the brake rotor 12. A larger portion of the space outside of the outer ring 4 can be exploited for installation of the motor generator 3, as the axial size of the rotor 19 also does not need to be extended to allow the rotor 19 to be fixed.

Figure 20:
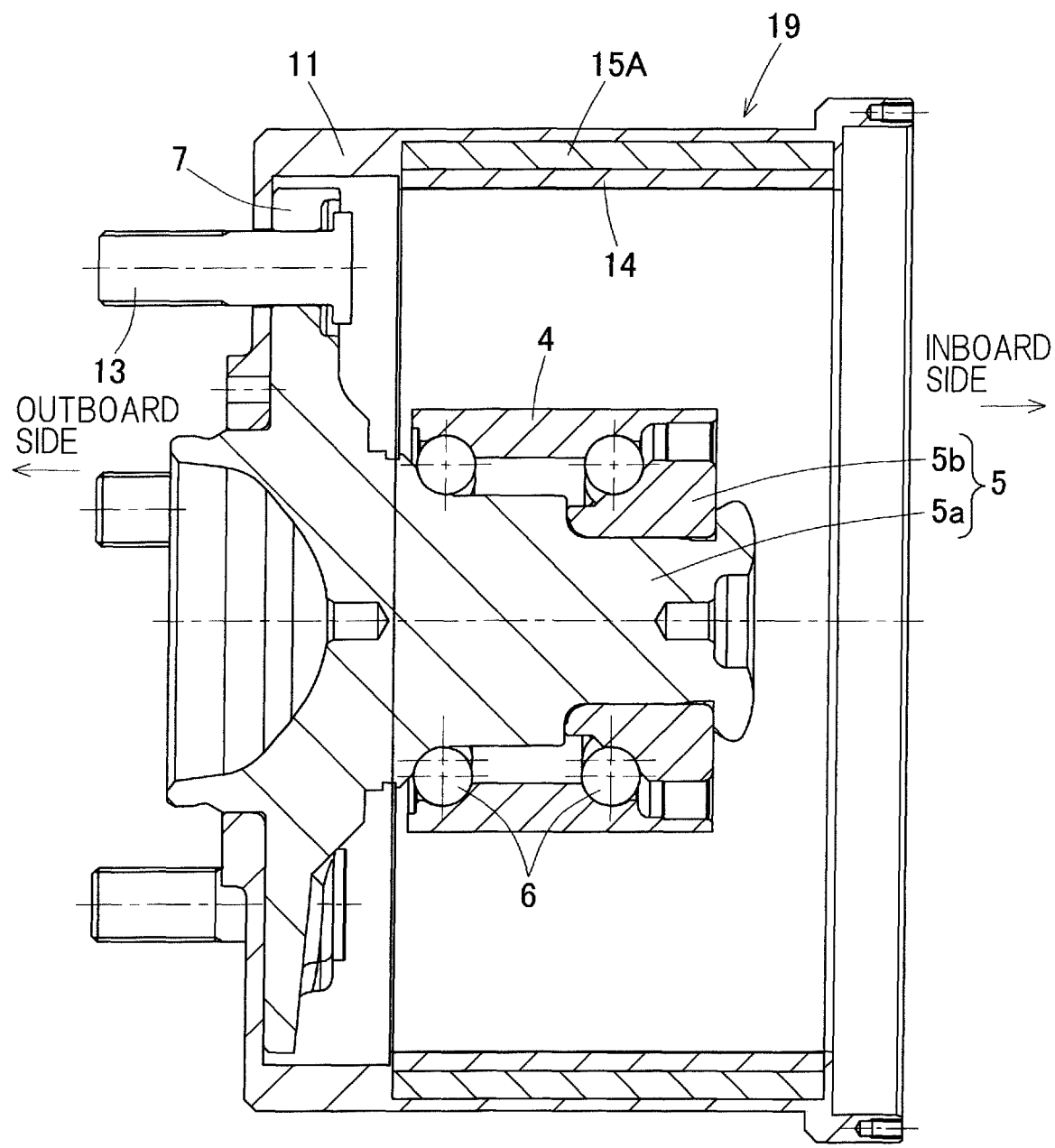
FIG. 20 shows a longitudinal cross sectional view of a part, in a simplified form, of a wheel support bearing assembly according to a seventh embodiment of the invention.

As in a seventh embodiment shown in FIG. 20, an insert molding process may be used to retain on an outer peripheral surface of the hub flange 7 an inner peripheral surface, on an outboard side, of a casing 11 made from resinous material. This can reduce the number of steps for fixing the rotor 19 to the wheel support bearing 2. Further advantageous effects similar to those of the sixth embodiment in FIG. 19 can also be realized.

In the above-mentioned embodiments, as the wheel support bearing 2, a so-called $3^{rd}$ generation hub bearing is employed, in which an inner ring 5 serving as a rotational ring includes a hub flange 7. The wheel support bearing 2 may be in the form of a so-called $2^{nd}$ generation hub bearing, in which an outer ring having double-row raceway surfaces is formed as a distinct piece from a mounting member to a knuckle, etc. The wheel support bearing 2 may also be a $1^{st}$ generation hub bearing, in which an inner ring having double-row raceway surfaces is constructed with a distinct piece from a hub flange part, when compared to the $2^{nd}$ generation hub bearing.

The motor generator 3 in the present embodiment is sized such that the stator 18 and an entirety of the rotor 19 extend radially inward of the peripheral section 12*b* of the brake rotor 12. However, the motor generator 3 is not limited to this construction. For instance, the stator 18 and a part of the rotor 19 may be sized to extend radially inward of the peripheral section 12*b* of the brake rotor 12. Although not shown, the motor generator may be that of an inner rotor design in which a rotor is located radially inward of a stator.

<Vehicular System>

FIG. 21 shows a block diagram which illustrates the concept configuration of a vehicular system employing the wheel support assembly or vehicle power assembly 1 according to one of the above-mentioned embodiments. In this vehicular system, the vehicle power assemblies 1 are installed to driven wheels 10B of a vehicle, which are mechanically non-coupled to a primary drive source for the vehicle. Wheel support bearings 2 (FIG. 9) of the vehicle power assemblies 1 are configured to support the driven wheels 10B.

The primary drive source 35 is chosen from an internal combustion engine such as a gasoline engine or a diesel engine, a motor generator (electric motor), and a hybrid design drive source that combines both. The term "motor generator" is used to refer to an electric motor to which rotation can be applied to generate power. In the illustrated example, the vehicle 30 is a front wheel drive vehicle in which front wheels are drive wheels 10A and rear wheels are the driven wheels 10B. The vehicle 30 is also a hybrid electric vehicle (which, hereinafter, may be referred to as an "HEV") in which the primary drive source 35 includes an internal combustion engine 35*a* and a motor generator 35*b* for the drive wheels.

More specifically, the vehicle 30 is that of a mild hybrid design in which the motor generator 35*b* for the drive wheels is powered with a medium voltage of, for example, 48V. Hybrids are roughly categorized into strong hybrids and mild hybrids. A mild hybrid refers to a design in which an internal combustion engine serves as a primary drive source and a motor mostly implements drive assist during starting or acceleration, etc. A mild hybrid is distinguished from a strong hybrid in that, in an EV (Electric Vehicle) mode, normal travel is only possible for a short period of time and not for an extended period of time. The internal combustion engine 35a in the example of the figure is operatively coupled through a clutch 36 and a speed reducer 37 to a driveshaft for the drive wheels 10A, and the motor generator 35b for the drive wheels is operatively coupled to the speed reducer 37.

The vehicular system includes motor generators 3 which serve as drive-assist power generators for driving the driven wheels 10B into rotation, individual controller modules 39 which control the motor generators, and an individual-motor-generator commander 45 which is provided in a superordinate ECU 40 to issue commands to cause the individual controller modules 39 to execute driving operation and regenerative operation control. The motor generators 3 are connected to a power storage unit. A battery (rechargeable battery) or a capacitor, etc. can be used for the power storage unit. Any type of the power storage unit can be employed, and the power storage unit may be installed to any location on the vehicle 30. In the present embodiment, the power storage unit is a medium voltage battery 49—among a low voltage battery 50 and the medium voltage battery 49 that are installed to the vehicle 30.

The motor generators 3 for the driven wheels are direct drive motors which do not involve transmissions. The motor generators 3 function as electric motors by receiving power supply and also function as power generators by converting the kinetic energy of the vehicle 30 into electrical power. Rotors 19 (FIG. 9) of the motor generators 3 are mounted to inner rings 5 (FIG. 9). Hence, application of electrical currents to the motor generators 3 drives the inner rings 5 (FIG. 9) into rotation, while, on the other hand, loading of a voltage induced during power regeneration allows for recovery of regenerated power. The drive voltage of a motor generator 3 for rotary driving or the regenerative voltage of a motor generator 3 is 100 V or less.

<Control System of Vehicle 30>

The superordinate ECU 40, which executes supervisory control of the vehicle 30, includes a torque command generator 43. The torque command generator 43 generates torque commands according to signals that are input from an accelerator operation unit 56 such as an accelerator pedal and from a brake operation unit 57 such as a brake pedal, which signals are indicative of the amount of operation thereof. Since the vehicle 30 includes, as the primary drive source 35, the internal combustion engine 35a as well as the motor generator 35b for the drive wheels, and also includes two motor generators 3 and 3 for driving the two respective driven wheels 10B and 10B, a torque command allocator 44 is provided in the superordinate ECU 40, which allocates the torque commands among the drive sources 35a, 35b, 3 and 3 according to a defined rule.

Torque commands for the internal combustion engine 35a are sent to an internal combustion engine controller 47 and are used by the internal combustion engine controller 47 for control of valve opening, etc. Torque commands for the motor generator 35b for the drive wheels are sent to a drive-wheels side motor generator controller 48 for execution. Torque commands for the power generators 3 and 3 for the driven wheels are sent to the individual controller modules 39 and 39. A part of the torque command allocator 44, which issues to the individual controller modules 39 and 39, is formed as the individual-motor-generator commander 45. The individual-motor-generator commander 45 has the additional functionality of providing torque commands to the individual controller modules 39 according to a signal indicative of the amount of operation of the brake operation unit 57, which torque command corresponds to braking force commands indicating the allocation of braking that is to be effected by the motor generators 3 through regenerative braking. The individual-motor-generator commander 45 and the individual controller modules 39 cooperate together to provide a controller module 68 for controlling the motor generators 3.

The individual controller modules 39 are inverter units including an inverter 41 which converts DC power from the medium voltage battery 49 into a 3-phase AC voltage; and a control portion 42 which controls an output of the inverter 41 by means of PWM control, etc. on the basis of the torque commands, etc. The inverter 41 includes a bridge circuit (not shown) formed of semiconductor switching elements, etc., and a charge circuit (not shown) to charge the medium voltage battery 49 with power regenerated by a motor generator 3. Note that, although the individual controller modules 39 are separately provided for each of the two motor generators 3 and 3, they may be integrated into a single unit having a control portion 42 that is shared by both of the individual controller modules 39 and 39.

Figure 22:
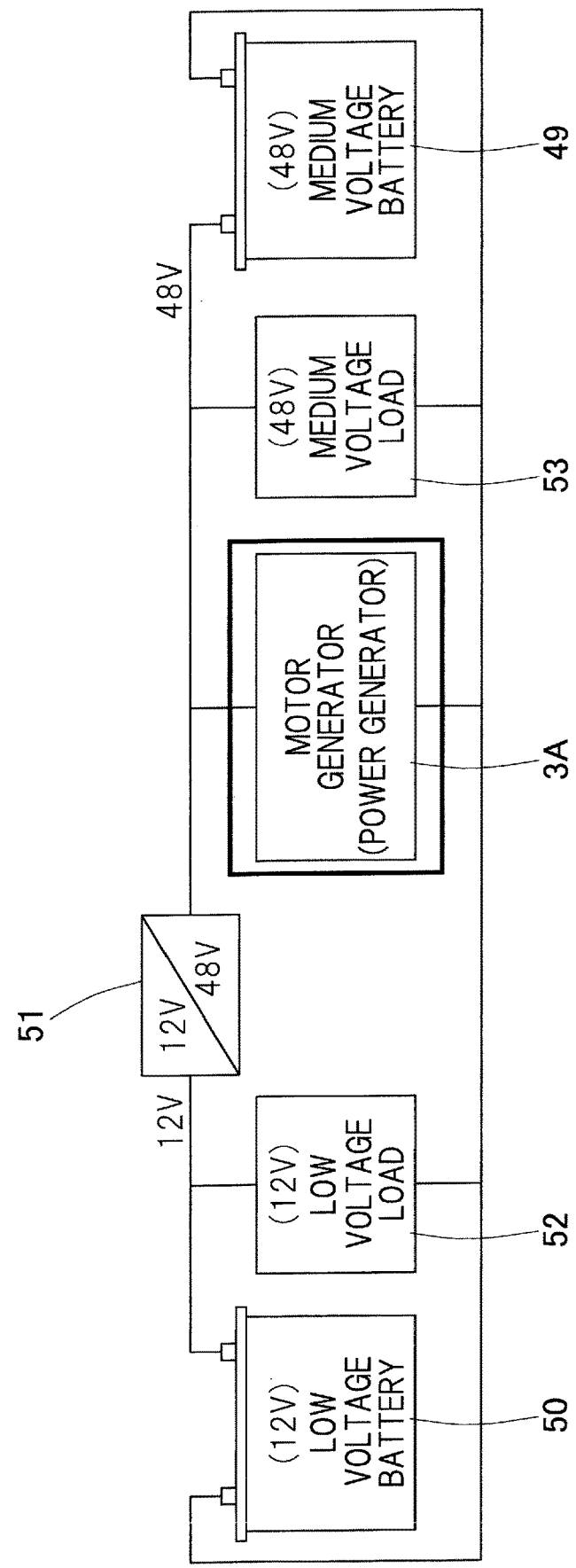
FIG. 22 shows a power supply system diagram of an example vehicle deploying the vehicular system.

FIG. 22 shows a power supply system diagram of an example vehicle deploying the vehicular system shown in FIG. 21. In the example of the figure, the low voltage battery 50 and the medium power battery 49 are provided as batteries. The batteries 49 and 50 are connected to each other via a DC to DC converter 51. Although there exist two motor generators 3, only one is shown as a representative. Also, although the motor generator 35b for the drive wheels in FIG. 21 has been omitted in FIG. 22, it is, in reality, connected to a medium power system in parallel with the motor generators 3 for the driven wheels. Low voltage loads 52 are connected to a low voltage system, and medium voltage loads 53 are connected to the medium voltage system. Although there exist a plurality of low voltage loads 52 and medium voltage loads 53, only one is shown as a representative for each.

The low voltage battery 50 is generally used in various types of motor vehicles as a power supply for a control system thereof, etc. and is, for example, 12V or 24V. The low voltage loads 52 include fundamental components such as a starter motor for the internal combustion engine 35a, lamps, the superordinate ECU 40, and other ECUs (not shown), etc. The low voltage battery 50 can be referred to as an auxiliary battery for electric/electronic and auxiliary components, while the medium voltage battery 49 can be referred to as an auxiliary battery for electric motive systems.

The medium voltage battery 49 has a higher voltage than that of the low voltage battery 50, but it has a lower voltage than that of a high voltage battery (100V or more; for example, in the order of 200 to 400V) that is used in strong hybrid vehicles, etc. The medium voltage battery 49 provides a voltage that generally would not be a problem in terms of its impact, through electrical shock. A 48V battery that is recently used in mild hybrids is preferred as the medium voltage battery 49. The medium voltage battery 49 such as a 48V battery can be installed to a traditional vehicle with an internal combustion engine in a relatively simple manner. The medium voltage battery 49 can be used in a mild hybrid to provide electrically-powered power assist or a regenerative operation in ways that reduce fuel consumption.

The medium voltage loads 53 for the 48V system include the accessory components such as a power assist motor which is the motor generator 35b for the drive wheels, an electric pump, an electric power steering system, a supercharger, and an air compressor. By configuring the accessory loads in the 48V system—though this may result in smaller power assist outputs than those configured with a higher voltage (e.g. a strong hybrid vehicle with 100V or more)—it is possible to lower electrical shock. Thinner insulating sheaths can be used for wires, thereby reducing the weights and the volumes of the wires. Further, as compared to 12V, higher power can be input or output with a smaller current. This allows for the use of an electric motor or a power generator with a smaller volume. These contribute to a reduction effect of fuel consumption of the vehicle.

The vehicular system in the present embodiment is suited to cooperate with these accessory components in a mild hybrid vehicle, so that they can be used as components with power assist and power regeneration capability. It should be noted that a CMG, a GMG, and a belt driven starter motor, etc. (none of them is shown) which can be used in a conventional, mild hybrid vehicle are all sensitive to the efficiency of a transmission and a speed reducer, etc. because their power assist or regeneration is implemented by acting on an internal combustion engine or a power unit.

In contrast, the vehicular system according to the present embodiment is deployed to act on the driven wheels 10B and not to engage with a primary drive source such as the internal combustion engine 35a or an electric motor (not shown), etc. Accordingly, it can directly exploit the kinetic energy of a vehicle body during power regeneration. Moreover, in the case that a CMG, a GMG or a belt driven starter motor is installed, their integration must be taken into consideration during a design stage of the vehicle 30, thereby making it difficult for them to be retrofitted.

In contrast, a motor generator 3 used with the present vehicular system, which is accommodated into a driven wheel 10B, can be retrofitted to a complete vehicle in steps similar in number to those for parts replacement. Thus, the 48V system in the present embodiment can be configured in a complete vehicle with only an internal combustion engine 35a. By equipping a vehicle power assembly 1 according to one of the embodiments and the abovementioned medium voltage battery 49, whose drive voltage or regenerative voltage is 100 V or less, as a battery for a motor generator to an existing vehicle with only an internal combustion engine 35a, the vehicle can be turned into a mild hybrid vehicle without needing significant modifications to the vehicle. Moreover, another motor generator 35b for auxiliary driving purpose can also be installed to the vehicle deploying the vehicular system according to the present embodiment, as in the example of FIG. 21. In this way, the amounts of power assist and power regeneration for the vehicle 30 can be increased, thereby further contributing to reduced fuel consumption.

Figure 23:
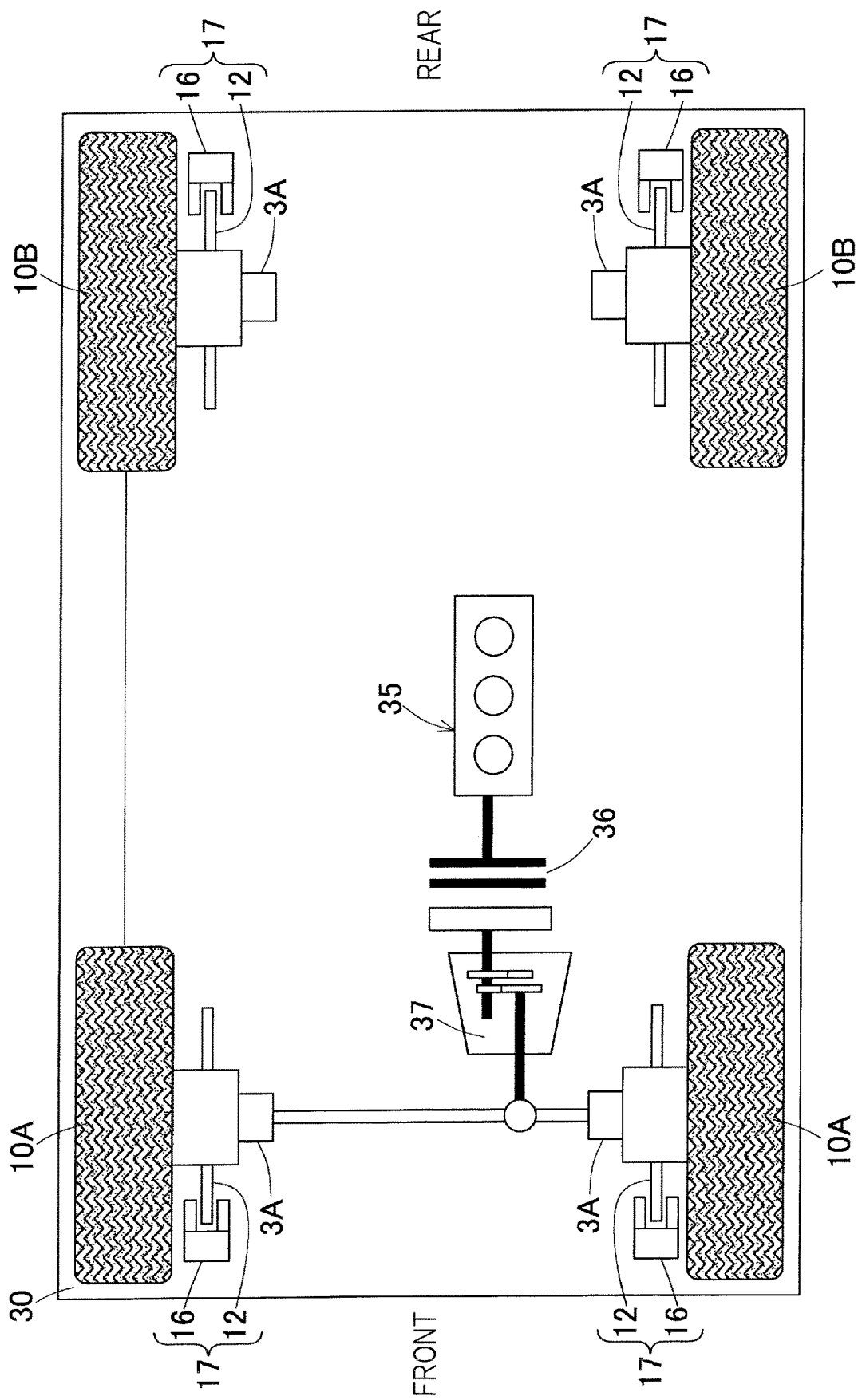
FIG. 23 shows a diagram illustrating the concept configuration of a vehicular system for another vehicle with the wheel support bearing assemblies.
Figure 24:
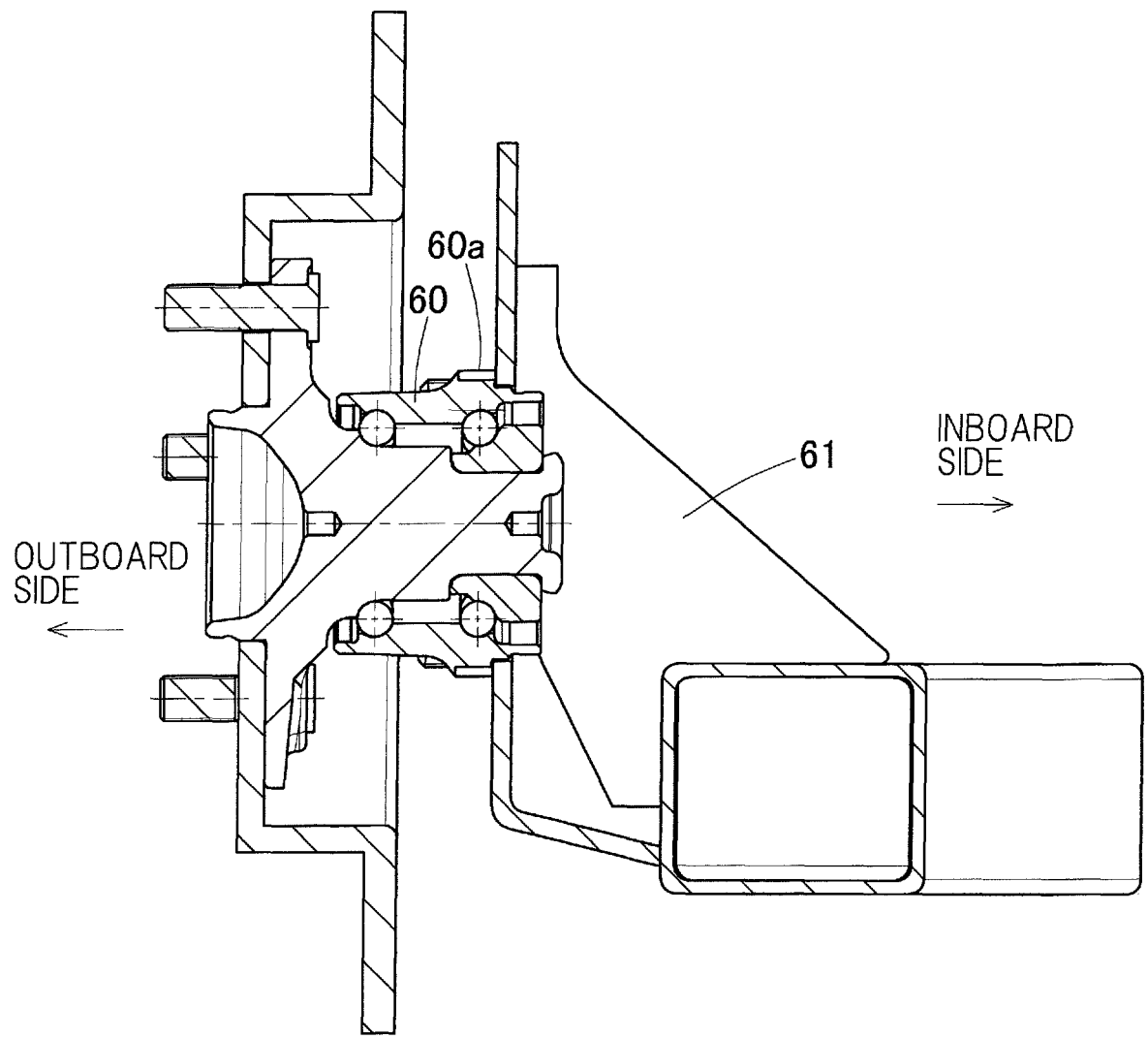
FIG. 24 shows a longitudinal cross sectional view of a wheel support bearing in a conventional example.
Figure 25:
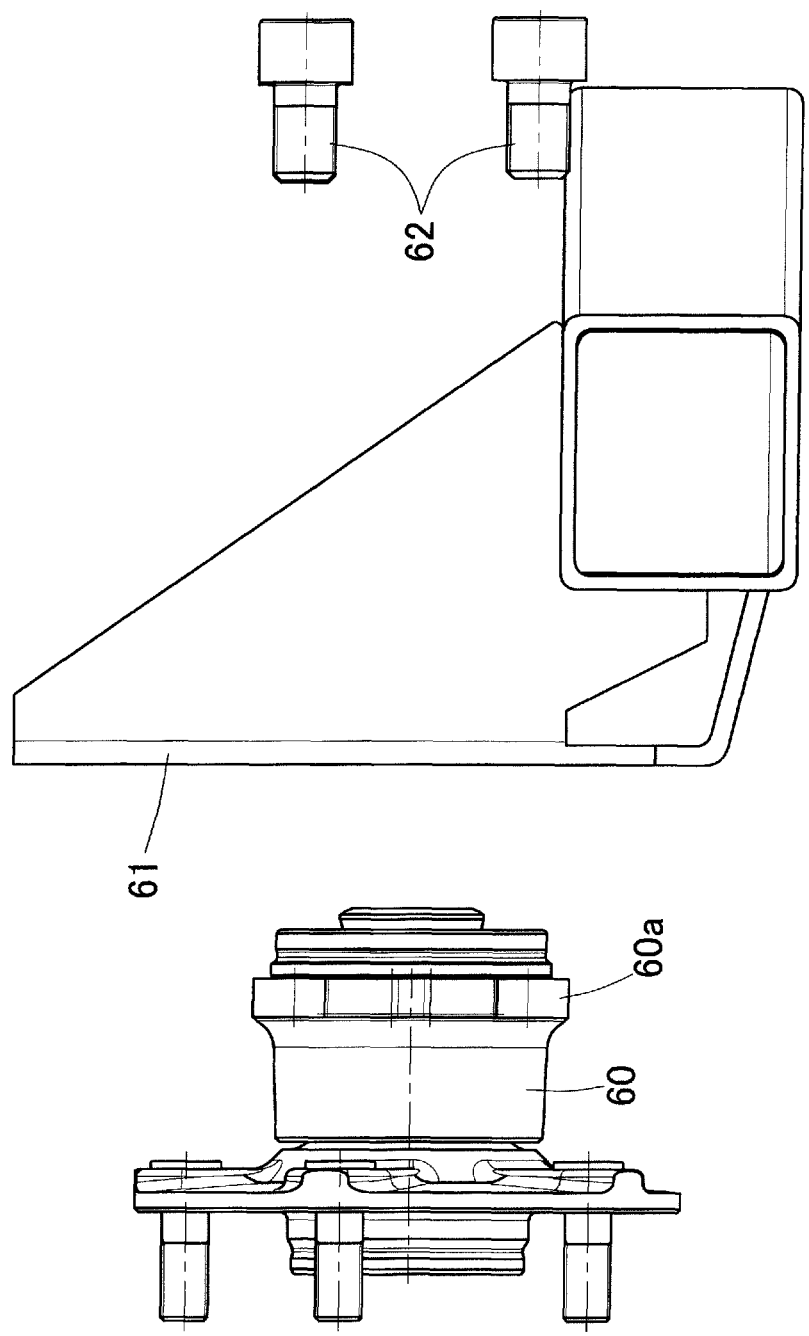
FIG. 25 shows a side view of the wheel support bearing, a brake rotor and a knuckle that are separated from each other.
Figure 26:
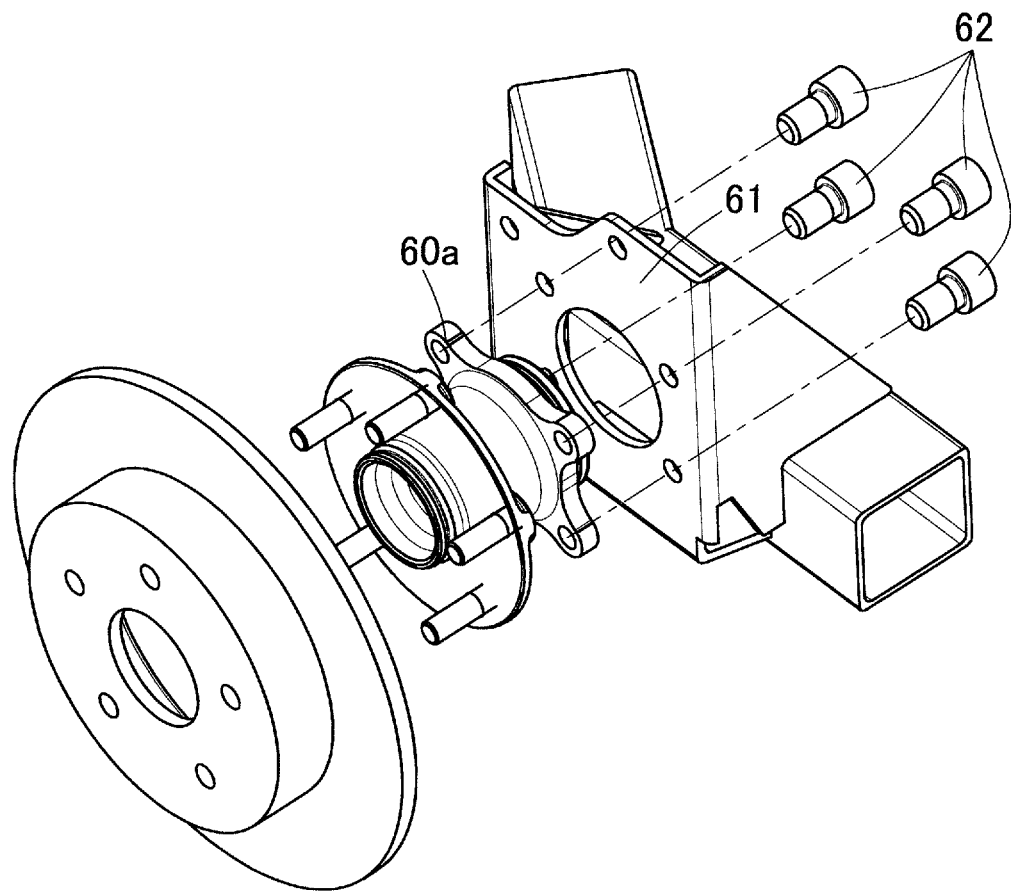
FIG. 26 shows a perspective view of the wheel support bearing, the brake rotor and the knuckle that are separated from each other.
Figure 27:
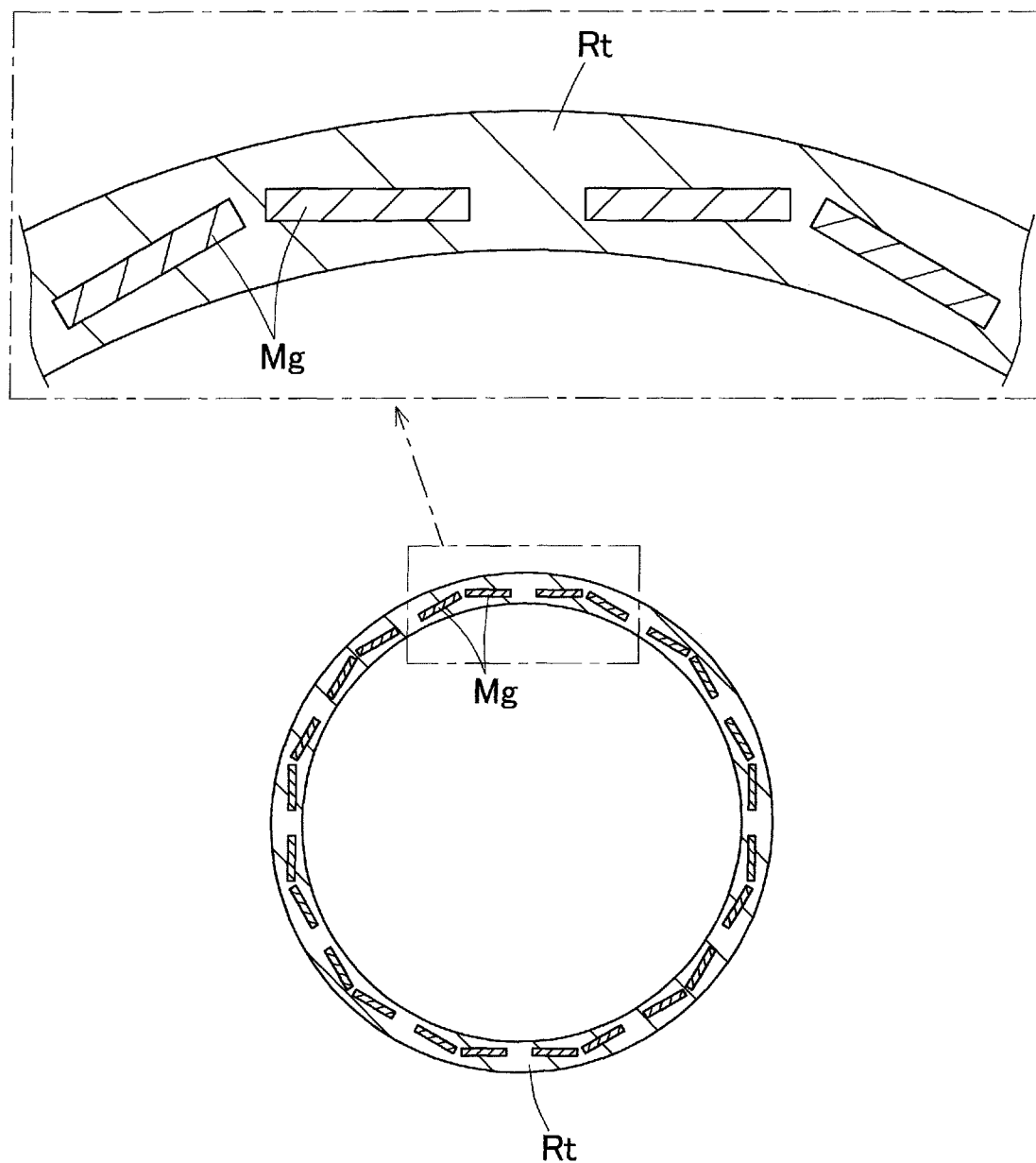
FIG. 27 shows a cross sectional view of an IPM motor.

FIG. 23 shows an example in which vehicle power assemblies 1 according to one of the above-mentioned embodiments are applied to both front, drive wheels 10A and rear, driven wheels 10B. The drive wheels 10A are driven, through a clutch 36 and a speed reducer 7, by a primary drive source 35 that is formed of an internal combustion engine. The vehicle power assemblies 1 are installed to this front wheel drive vehicle for the support and auxiliary driving of each of the drive wheels 10A and the driven wheels 10B. Accordingly, a vehicle power assembly 1 can be applied to a drive wheel 10A as well as to a driven wheel 10B.

The vehicular system shown in FIG. 21 may be configured as a system which has power generation functionality but is not fed power to effect rotary driving. In this case, regenerative power can be generated by a motor generator 3 so as to effect a braking force, by storing it in the medium voltage battery 49. The combined use or separate use of the mechanical, brake operation unit 57 can also improve braking performance. Where the functionality is thus limited to power generation, an individual controller module 39 does not have to be an inverter unit, but can be configured as an AC to DC converter unit (not shown). The AC to DC converter unit has the functionality to charge the medium voltage battery 49 with power regenerated by a motor generator 3 by converting 3-phase AC voltage to DC voltage. As compared to an inverter, the control method is simpler, and further, a reduction in size is possible.

Furthermore, although a vehicle power assembly 1 in the present embodiment is that of a $3^{rd}$ generation design, in which; an outer ring is formed as a stationary ring; a hub ring to which a partial inner ring is press-fitted is formed as a rotational ring; and the outer ring, the inner ring and the partial inner ring cooperate together to from a wheel support bearing assembly, a vehicle power assembly 1 is not limited to this. Any structure, where a hub having a hub flange is combined with a member having a raceway surface for rolling elements, forms a rotational ring. For example, it may be that of a $1^{st}$ generation design with an outer ring serving as a stationary ring, and an inner ring for being fitted to an outer peripheral surface of a hub with a hub flange. It may also be that of a $2^{nd}$ generation design with inner ring rotation, with an outer ring serving as a stationary ring, and an inner ring which is fitted to an outer peripheral surface of a hub with a hub flange. In these examples, the combination of the hub and the inner ring forms a "rotational ring". It may also be that of a $2^{nd}$ generation design with outer ring rotation, with an outer ring serving as a rotational ring with a hub flange, and an inner ring serving as a stationary ring.

The invention encompasses the following Modes 1 to 10 which do not limit where a power unit is positioned in an axial direction.

[Mode 1]

A vehicle power assembly according to Mode 1 includes a wheel support bearing and a power generator. The wheel support bearing includes a stationary ring, and a rotational ring rotatably supported via rolling elements by the stationary ring and having a hub flange to which a wheel of a vehicle and a brake rotor are attached. The power generator includes a stator mounted to the stationary ring of the wheel support bearing, and a rotor mounted to the rotational ring of the wheel support bearing. The power generator is that of a surface permanent magnet type in which the rotor includes a cylindrical magnetic body made from soft magnetic material and permanent magnets on a peripheral surface of the magnetic body.

[Mode 2]

In the vehicle power assembly described in Mode 1, the power generator is that of an outer rotor design in which the rotor is located radially outward of the stator, and the rotor is secured to an outer peripheral surface of the hub flange.

[Mode 3]

In the vehicle power assembly described in Mode 1 or 2, the rotor includes a cylindrical casing made from resinous material that is molded integrally with the magnetic body.

[Mode 4]

In the vehicle power assembly described in any one of Modes 1 to 3, the wheel support bearing is configured to support a driven wheel that is mechanically non-coupled to a primary drive source for the vehicle.

[Mode 5]

In the vehicle power assembly described in any one of Modes 1 to 3, the wheel support bearing is configured to support a drive wheel that is mechanically coupled to a primary drive source for the vehicle.

[Mode 6]

In the vehicle power assembly described in any one of Modes 1 to 5, the stationary ring of the wheel support bearing is an outer ring, and the rotational ring of the wheel support bearing is an inner ring.

[Mode 7]

In the vehicle power assembly described in any one of Modes 1 to 6, a rotation sensor is provided which is configured to detect a rotational speed of the rotational ring relative to the stationary ring.

[Mode 8]

In the vehicle power assembly described in any one of Modes 1 to 7, the power generator is a motor generator capable of driving the wheel into rotation, and a drive voltage of the motor generator for rotary driving or a regenerative voltage of the motor generator is 100 V or less.

[Mode 9]

A vehicle includes a vehicle power assembly described in any one of Modes 1 to 8.

[Mode 10]

A power generator for being disposed on a wheel support bearing includes a stator configured to be mounted to a stationary ring of the wheel support bearing, and a rotor configured to be mounted to a rotational ring of the wheel support bearing. The stator and a part or an entirety of the rotor are sized to extend radially inward of a peripheral section of a brake rotor, against which a brake caliper is pressed, with the brake rotor being attached to the rotational ring. An entirety of the power generator, excluding a mount part thereof to a hub flange, provided on an outboard side, of the rotational ring, is sized to be situated in an axial range between the hub flange and an outboard side face of an undercarriage frame component of the vehicle. The power generator is that of a surface permanent magnet type in which the rotor includes a cylindrical magnetic body made from soft magnetic material and permanent magnets on a peripheral surface of the magnetic body.

While preferred embodiments have thus far been described in connection with the drawings, a person skilled in the art who read the instant specification would readily conceive that various changes and modifications can be made therein to the extent that they are apparent. Accordingly, such changes and modifications are construed to be within the scope of the invention as defined by the claims.

REFERENCE NUMERALS

2 . . . wheel support bearing
3 . . . power unit
4 . . . outer ring (stationary ring)
5 . . . inner ring (rotational ring)
6 . . . rolling element
7 . . . hub flange
10A, 10B . . . drive wheel and driven wheel
12 . . . brake rotor
12b . . . peripheral section
14 . . . permanent magnet
15 . . . outer shell magnetic body
18 . . . stator
19 . . . rotor
69 . . . recess
70 . . . projection

What is claimed is:

1. A wheel support bearing assembly, comprising:
a wheel support bearing including:
a stationary ring;
a rotational ring to which a wheel of a vehicle is attached, the rotational ring being rotatably supported via rolling elements by the stationary ring; and
a brake rotor attached to the rotational ring; and
a power unit including:
a stator mounted to the stationary ring; and
a rotor mounted to the rotational ring,
the power unit being that of an outer rotor design in which the stator is located at an outer periphery of the wheel support bearing and the rotor is located radially outward of the stator,
an entirety of the power unit being sized to extend radially inward of a peripheral section of the brake rotor, against which a brake caliper is pressed,
an entirety of the power unit, excluding a mount part thereof to a hub flange, provided on an outboard side, of the rotational ring, being sized to be situated in an axial range between the hub flange and a mount surface, on an inboard side of the wheel support bearing, with respect to a vehicle body, and
the rotor including: an outer shell magnetic body, which is made from soft magnetic material and forms an outer shell of the power unit; and permanent magnets that are provided to the outer shell magnetic body,
wherein an inner peripheral surface, on an outboard side, of the rotor is secured to an outer peripheral surface of the hub flange.

2. The wheel support bearing assembly as claimed in claim 1, wherein one of the outer peripheral surface of the hub flange and the inner peripheral surface, on the outboard side, of the rotor has a radially recessed recess, and the other has a projection that is fitted into the recess.

3. The wheel support bearing assembly as claimed in claim 1, wherein the wheel support bearing is configured to support a driven wheel that is mechanically non-coupled to primary drive source for the vehicle or a drive wheel coupled to the primary drive source for the vehicle.

4. The wheel support bearing assembly as claimed in claim 1, wherein the stationary ring of the wheel support bearing is an outer ring, and the rotational ring of the wheel support bearing is an inner ring.

5. The wheel support bearing assembly as claimed in claim 1, wherein a drive voltage of the power unit for rotary driving or a regenerative voltage of the power unit is 100 V or less.

6. The wheel support bearing assembly as claimed in claim 1, wherein the power unit is a motor generator serving as both an electric motor and a power generator.

7. The wheel support bearing assembly as claimed in claim 1, wherein the rotor includes a cylindrical casing made from resinous material that is molded integrally with the magnetic body.

8. The wheel support bearing assembly as claimed in claim 1, further comprising a rotation sensor configured to detect a rotational speed of the rotational ring relative to the stationary ring.

9. The vehicle power assembly as claimed in claim claim 1, the wheel support bearing assembly being installed to a vehicle, wherein the mount surface, on an inboard side, with respect to the vehicle body is an outboard side face of an undercarriage frame component of the vehicle.

10. A vehicle comprising a wheel support bearing assembly as claimed in claim 1.

* * * * *

UNITED STATES PATENT AND TRADEMARK OFFICE
CERTIFICATE OF CORRECTION

| | |
|---|---|
| PATENT NO. | : 11,577,598 B2 |
| APPLICATION NO. | : 16/810314 |
| DATED | : February 14, 2023 |
| INVENTOR(S) | : Mitsuo Kawamura et al. |

It is certified that error appears in the above-identified patent and that said Letters Patent is hereby corrected as shown below:

In the Claims

Column 24, Line 63:
In Claim 9, after "claimed in" delete "claim".

Signed and Sealed this
Twenty-eighth Day of March, 2023

*Katherine Kelly Vidal*

Katherine Kelly Vidal
*Director of the United States Patent and Trademark Office*